US006931553B1

(12) United States Patent
Plante et al.

(10) Patent No.: US 6,931,553 B1
(45) Date of Patent: Aug. 16, 2005

(54) PREVENTING GENERAL PURPOSE EVENT INTERRUPT STORMS IN A COMPUTER SYSTEM

(75) Inventors: Stephane G. Plante, Kirkland, WA (US); Jacob Oshins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/552,944

(22) Filed: Apr. 20, 2000

(51) Int. Cl.[7] .......................... G06F 1/26; G06F 13/00
(52) U.S. Cl. ................. 713/310; 719/318; 710/262
(58) Field of Search ....................... 713/300, 310, 713/320, 323, 324; 710/260, 261, 262, 263; 709/310, 318; 714/1; 718/100; 719/318

(56) References Cited

U.S. PATENT DOCUMENTS

| | | | |
|---|---|---|---|
| 5,230,074 A | | 7/1993 | Canova et al. |
| 5,754,869 A | * | 5/1998 | Holzhammer et al. ...... 713/300 |
| 5,937,200 A | * | 8/1999 | Frid et al. .................... 710/264 |
| 6,055,643 A | * | 4/2000 | Chaiken ...................... 713/323 |
| 6,393,570 B1 | * | 5/2002 | Henderson et al. .......... 713/310 |
| 6,499,102 B1 | * | 12/2002 | Ewertz ........................... 713/1 |
| 6,567,931 B1 | * | 5/2003 | Jue ............................... 714/23 |
| 6,691,238 B1 | * | 2/2004 | Forbes et al. ................ 713/323 |

FOREIGN PATENT DOCUMENTS

JP 06035724 A * 2/1994 ............. G06F 9/46

OTHER PUBLICATIONS

Research Disclosure, Jun. 1999, UK-13 "Improved Personal Computer Home Control Using Power and Boot Sequence Control" Jun. 1, 1999—vol. 42, Issue 422.*

* cited by examiner

Primary Examiner—Thuan Du
(74) Attorney, Agent, or Firm—Law Offices of Albert S. Michalik, PLLC

(57) ABSTRACT

A method and system for selectively enabling wake events in software of a computer system to overcome problems arising when hardware devices fail to clear a wake signal. The operating system manages wake events, and also distinguishes between events that are exclusively wake events, exclusively run-time events, and shared wake and run-time events. At boot time, the ACPI driver examines system tables provided by firmware to determine which GPEs are associated with wake-up events, either exclusively or shared with run-time events. These wake event associations are tracked and managed differently from events received on other hardware register pins. When the operating system receives events in a GPE Status hardware register that is enabled in a counterpart Enable register, the operating system runs an associated GPE method. When the GPE method has completed, the operating system selectively determines whether the event needs to be re-enabled.

31 Claims, 18 Drawing Sheets

PREVENTING GENERAL PURPOSE EVENT INTERRUPT STORMS IN A COMPUTER SYSTEM

FIELD OF THE INVENTION

The present invention relates generally to computer devices, and more particularly to power management in computer-related devices.

BACKGROUND OF THE INVENTION

ACPI (Advanced Configuration and Power Interface) is an open industry specification that defines a flexible and extensible interface for computer power management and related control operations. In general, the interface enables and supports power management through improved hardware and operating system coordination. ACPI allows the operating system to control the power states of many ACPI-compliant hardware components, and/or to pass information to and from some hardware components.

The ACPI Specification 1.0b describes how a system vendor can use General Purpose Events (GPE) to inform the operating system that a certain event has occurred. The specification distinguishes between run-time GPEs, which are related to events that occur while the computer is running, (e.g., state changes related to a thermal sensor or the power remaining in a battery), and wake GPEs, which are related to events that occur to possibly wake the computer system (or one or more devices therein) while the computer/device is in one of a plurality of sleep states. The specification allows the two types of events to be intermixed onto the same hardware signal.

ACPI enables individual devices of the computer system to go into a sleep state, thereby conserving power on the computer system. Device states may range from a D0 (working state) to D3 (fully off) state. The computer system as well may go into sleep-relative states, which may range from system state S0 (working) to S5 (fully off) with various possible states (e.g., S1, light sleep, S3 deep sleep, S4 hibernation) in between. Wakeup signaling events, such as the opening of a lid on a laptop computer, the pressing of a keyboard key, moving of a mouse, and so forth, are supposed to wake the devices and the system as necessary, such as to match a user's preferences. More particularly, wake event signals are issued by a corresponding hardware device to a Status register pin, (e.g., a low signal is output to a formerly high signal register location, or vice versa). If the software is enabled for such an event, i.e., in a counterpart Enable register, some action (e.g., a system control interrupt or SCI) will be taken to wake a sleeping computer and/or a device associated with that register location. For example, one type of wake event that may result in a specific device being woken up is to wake up a modem (move the modem from the D3 to the D0 state, as well as wake the computer if necessary) when a telephone ring is detected.

While the ACPI specification thus provides directions for properly waking computer systems and the devices therein, a significant problem is that many system vendors connect certain wake GPEs in a way that violates the specification, thereby potentially confounding the operating system. Normally, when the operating system takes a GPE event, it begins by masking off the GPE Enable register for that event, processing the event, clearing the GPE Status register for that event, and then re-enabling that event in the Enable register. However, if the hardware is implemented incorrectly, the operating system is not able to clear the GPE Status register when it normally should, i.e., when the operating system performs its interrupt handling processing (to run a GPE method) and then attempts to clear the GPE Status register, the underlying hardware event is not dismissed by the hardware as it should be. Then, when the event is re-enabled in the Enable register, the event fires again. In other words, if a hardware signal cannot be cleared in accordance with the ACPI specification, the operating system thinks that the signal is cleared, whereby the signal is re-enabled and the operating system receives another notification that the event has fired and repeats the process. If the signal is still not cleared, then the operating system, which handles interrupts at a higher priority than other processing, is essentially stuck in an infinite loop handling interrupts (a general purpose event (GPE) storm) that cannot be terminated until the signal is clear. As a result, when the operating system tries to wake up from the sleep state, it cannot, because the GPE events will not clear, causing an interrupt storm. This may also occur while the device is in a running state, and an event signal corresponding to waking a device, such as a network card, cannot be cleared. Unfortunately for the owners of such machines, a vast number of machines are "broken" in precisely this manner, whereby their sleep features cannot be properly used. Further complicating matters is that certain hardware devices use GPE pins that share wake-up and run-time events.

SUMMARY OF THE INVENTION

Briefly, the present invention provides a method and system that solves the problem of interrupt storms by selectively enabling wake GPEs (in the Enable register) only when the operating system wants the particular devices associated with the wake GPEs to be able to notify the operating system that a wake event has occurred. The operating system thus intelligently manages wake GPEs. The operating system also distinguishes between events that are exclusively wake, run-time, and shared wake and run-time events.

To this end, in one implementation described herein, the present invention utilizes several algorithms to manipulate and remember various sets of state regarding GPEs. In this implementation, the sets of states are maintained in operating-system-internal structures referred to herein as software registers (a block of storage allocated in the computer's main memory, having an arbitrary location, size and contents), including a GpeWakeHandler software register, which comprises a mask of bits representing GPEs used exclusively for wake-up events, a GpeSpecialHandler software register, which comprises a mask of bits representing GPEs which might be used for wake-up events but should be treated as regular GPEs, and a GpePending software register, which comprises a mask of bits which represent GPEs on which processing has started, but has not yet completed. The ACPI driver uses these masks in combination with a GpeEnable software register, GpeWakeEnable software register (which maintains a list of GPE pins which are enabled because of a wakeup event) and GpeCurEnable software register (which provides a mask of bits which are currently enabled) to intelligently manage the GPEs.

At boot time, the ACPI driver uses an algorithm to examine the system tables/namespace (built from firmware information) to determine which GPEs are associated with wake-up events, either exclusively or shared with run-time events, so that they can be managed differently from the other pins (which will be managed according to the ACPI specification). In particular, the ACPI driver looks for and specially handles the Lid, PowerButton, SleepButton, and Real-Time-Clock devices because these devices typically use a GPE pin that share wake-up and run-time events. Of course, other such mechanism may be similarly specially handled. Wake only events are enabled when the operating system deems it appropriate for them to be enabled, e.g., while the computer has been in a running state and the operating system has decided that some device needs that wake event enabled because the device needs to be able to wake up the computer.

In general, after the operating system has determined which GPEs are run-time, wake only, or shared, when the operating system receives events in the GPE Status register, the operating system runs an associated GPE method. When the GPE method has completed, the operating system selectively determines whether the event needs to be re-enabled. This is done (in part) by determining if the event is wake only, (e.g., via access and manipulation of the state information in the registers), and if there is no outstanding request for that event to wake up the computer.

A function is described that operates on the various registers to remove completed events from the list of those pending, remove events that are not in the current list of enabled events, remove each event for which there is a wake handler but which is not listed in the list of wake enables, and re-enabling those that remain. In that way, wake only events are enabled only when the operating system determines that they should be active, while shared wake and run-time events are enabled during run-time but handled differently.

Other advantages will become apparent from the following detailed description when taken in conjunction with the drawings, in which:

DETAILED DESCRIPTION

Exemplary Operating Environments

Figure 1:
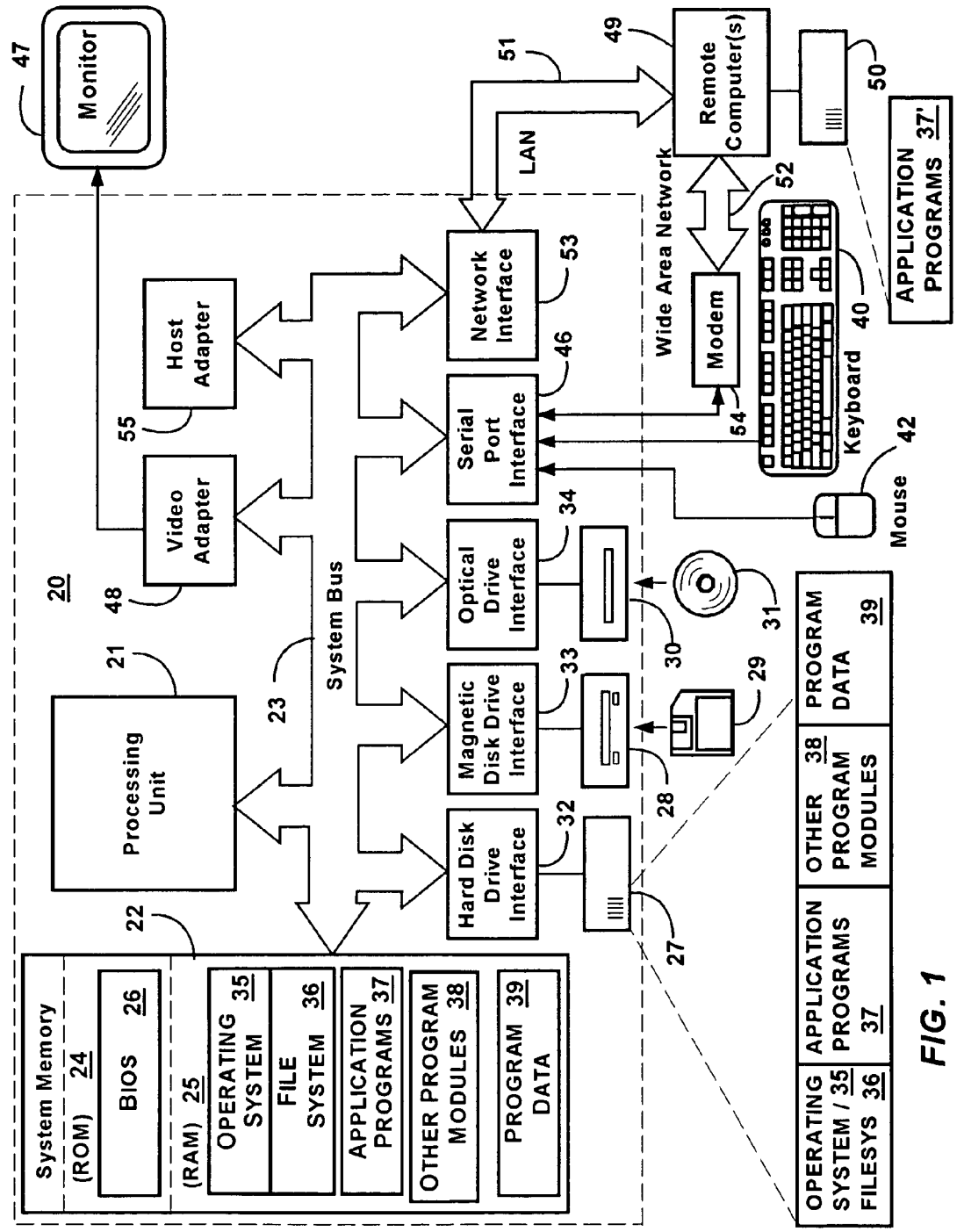
FIG. 1 is a block diagram representing an exemplary computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. On an ACPI system, as described herein, the vendor provided ACPI Machine Language (AML) code, generally referred to as the ACPI BIOS, is also ordinarily stored within the ROM. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (such as Microsoft Corporation's Windows® 2000, formerly Windows NT®, operating system). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While the present invention is primarily described with respect to the Windows® 2000 operating system, those skilled in the art will appreciate that other operating systems and/or file systems may implement and benefit from the present invention.

Illustrative Configuration Management System

Figure 2:
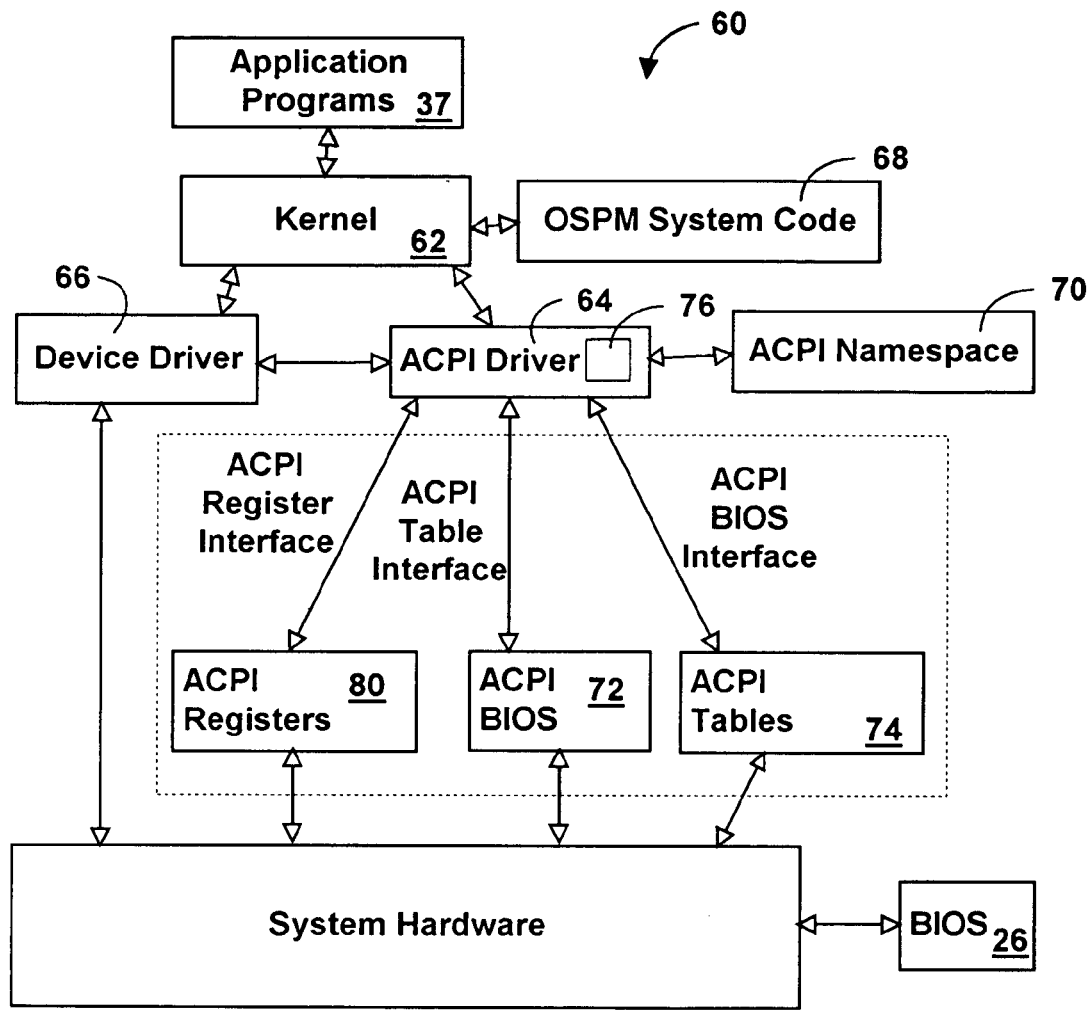
FIG. 2 is a block diagram representing an ACPI system including an ACPI driver capable of implementing the present invention.

FIG. 2 is a functional block diagram of an ACPI system 60 as implemented in the computer system 20 of FIG. 1. The ACPI system 60 illustrated is one example of a configuration management system that may benefit from the present invention. The present invention is primarily described herein with reference to the ACPI configuration management system, however, there is no intention to limit the present invention to ACPI. Rather, the present invention is intended to operate with and provide benefits with any operating system, architecture, and/or configuration management system.

As shown, the application programs 37 may interface with a kernel 62, which is a part of the operating system 35, generally via application programming interface (API) calls or the like. The kernel 62 can be generally considered as one or more software modules that are responsible for performing many operating system functions. One such function is passing information between the application programs 37 and the lower level components of the ACPI system 60, such as the ACPI driver 64 (described below) and various device drivers (e.g., device driver 66).

The kernel 37 also interfaces with Operating System Power Management (OSPM) system code 68. The OSPM system code 68 comprises one or more software modules that may be a part of the operating system 35 and that may be used to modify the behavior of certain components of the computer system 20, typically to conserve power in accordance with pre-configured power conservation settings. As is generally known, the various device drivers 66 interface with and generally control the hardware installed in the computer system 20. A driver communicates with other drivers and the operating system components (e.g., an I/O manager), for example in the Windows® 2000 (and Windows NT®) operating systems, by passing I/O request packets, or IRPs.

In general, the ACPI driver 64 is a module that controls the functioning of much of the ACPI system 60. The ACPI driver 64 may be supplied as part of the operating system 35 or as a separate component. In the described system, the ACPI driver 64 is loaded during system start-up at the base of a tree of devices, where it acts as an interface between the operating system 35 and the BIOS 26. The responsibilities of the ACPI driver 64 include support for plug and play (PnP) and, in keeping with the present invention as described below, power management. The ACPI driver 64 is responsible for initiating and maintaining the ACPI system 60, such as by populating an ACPI namespace 70 (represented in FIG. 3 and described below) at system startup, loading and unloading description blocks from the ACPI namespace 70 at run time, handling certain generic events triggered by ACPI-compliant hardware, and handing off other events to modules registered to handle those events.

The ACPI driver 64 makes use of several components when performing the functions of the ACPI system 60. One component is the ACPI BIOS 72, which refers to the portion of system firmware that is compatible with the ACPI specification. Generally stated, the ACPI BIOS 72 is part of the code that boots the machine (similar to the BIOS present in most conventional computer systems) and implements interfaces for power and configuration operations, such as sleep, wake, and some restart operations. The ACPI BIOS 72 contains definition blocks used to construct ACPI Tables 74, as is described in greater detail below. Note that although the BIOS 26 and the ACPI BIOS 72 are illustrated as separate components in FIG. 2, they may be implemented as one component in the computer system 20.

The ACPI Tables 74, generally known as Differentiated Definition Blocks (DDBs), are composed of as few as one, but most likely many, definition blocks that contain data and/or control methods. Each set of data and/or control methods defines and provides access to a respective hardware device. The tables include header data structures that contain information about what the block contains, for example, whether it is a Differentiated System Description Table (DSDT) or a Secondary System Descriptor Table (SSDT). Each table (SSDT or DSDT) contains only one Definition Block. One such definition block, known as a Differentiated System Description Table (DSDT) describes the base computer system, that is, the DSDT contains a Differentiated Definition Block (DDB), which describes the root system. The DSDT is like other Data blocks, except that it cannot be unloaded. Other definition blocks may be provided to describe additional ACPI devices. The definition blocks are written in an interpreted language called ACPI Machine Language (AML), the interpretation of which is performed by an AML interpreter 76 within the ACPI driver 64.

As mentioned, the definition blocks may contain control methods. A "control method" is a software module that defines how the ACPI system 60 performs a hardware-related task. For example, the ACPI system 60 may invoke a control method to read the temperature of a thermal zone, change the device power state of a modem, and so forth. Control methods are written in AML, are stored in the definition blocks within the ACPI BIOS 72, and are loaded into the ACPI namespace 70 (FIG. 3), typically at system boot up. Once in the ACPI namespace 70, the control methods may be invoked by other components in the ACPI system 60, such as device drivers or the like, and are then interpreted and executed by a virtual machine in the ACPI driver 64. The use and structure of the ACPI namespace 70, and exemplary objects within, are generally described below with respect to FIG. 3.

ACPI registers 80 are a constrained part of the hardware interface, described (at least in location) by the ACPI Tables 74. For a more detailed discussion of the ACPI tables 74, definition blocks, and other functions performed by the ACPI driver, refer to Sections 5 and 16 of the publicly-available ACPI Specification Version 1.0, which is hereby incorporated by reference in its entirety.

Figure 3:
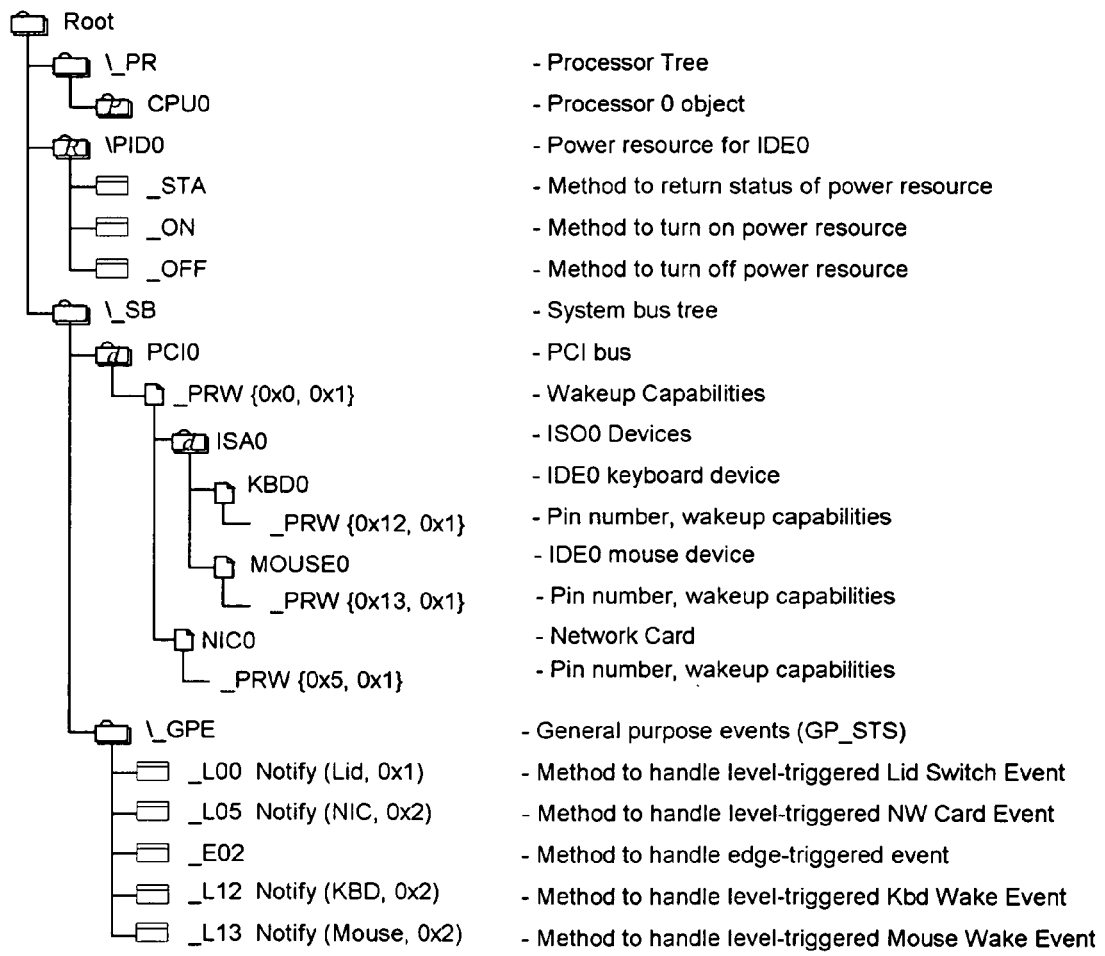
FIG. 3 is a representation of a hierarchical namespace built by the ACPI driver from firmware information to represent a computer system, and accessed thereby to execute methods specified in the firmware, including wake operations, in accordance with the present invention.

FIG. 3 is a graphical representation of one possible ACPI namespace 70 which is created hierarchically and essentially represents a working version of the ACPI tables 74. The ACPI Namespace 70 is a hierarchical tree structure in protected memory that contains named objects which describe the ACPI-aware devices installed in the computer system 20. The objects may be data objects, control method objects, bus/device package objects, or the like. The information in the ACPI namespace 70 comes from the Differentiated Data Blocks (DDB) stored in the ACPI BIOS 72. The DSDT contains a Differentiated Definition Block (DDB). As mentioned, at boot time, the operating system 35 (via the ACPI driver 64) reads the ACPI tables 74 from the ACPI BIOS 72 and loads certain definition blocks (e.g., the DDBs) from the ACPI tables 74 to construct the ACPI namespace 70. The ACPI driver 64 may dynamically change the contents of the ACPI namespace 70 during run time operations by loading and/or unloading additional definition blocks from the ACPI Tables 74.

Shown in FIG. 3 is one illustrative ACPI namespace 70, containing a namespace root, several illustrative branches under the root, and several other objects of various types. For example, under the root is a processor tree namespace \_PR. Processor objects, such as the Processor 0 object CPU0, are defined under the processor tree \ _PR namespace. For more information about processor objects, see Section 8 of the ACPI Specification.

The \ _SB namespace includes namespace objects that define ACPI-compliant components attached to the system bus. One example of such a namespace object is the PCI bus namespace object. Each namespace object may have other objects as children thereof, such as data objects, control methods, or other namespace objects (e.g., ISA0 namespace object). The objects having a _PRW child are those with wakeup capabilities, and the pin number in the ACPI register to which they are wired (described below) is specified therein, along with wakeup information, e.g., the "deepest" system state from which the device can wake the computer. In general, the ACPI driver locates these devices and may treat them special to facilitate wakeup capabilities in accordance with one aspect of the present invention, as described below.

Several control methods may be loaded in the ACPI namespace in connection with various objects, including the methods run on detection of wakeup events in the \ _GPE namespace. For example, as shown in FIG. 3, a notify control method will execute on a network card (Nic) event wired to pin 5 of the hardware register 80. The \_GPE namespace includes additional control methods to handle other general purpose events (including wakeup events) triggered by ACPI-aware components in the ACPI system 60. For GPE events, the ACPI driver 64 will execute the control method of the name \_GPE._Exx and \_GPE._Lxx, wherein as used herein, 'E' indicates an edge-triggered event and 'L' a level-triggered event, and xx represents a hex value format of the event that needs to be handled, such as those exemplified in FIG. 3. Note that the format for namespace object is "\"+4 characters+"."+4 characters+"." . . . +"."+4 characters, where the leading "\" is optional and can be replaced with a "^" to indicate "one level up," "^^" to indicate "two levels up" and so forth. Further, note that FIG. 3 contains a representation of what the AML does, not the actual AML itself.

Figure 4:
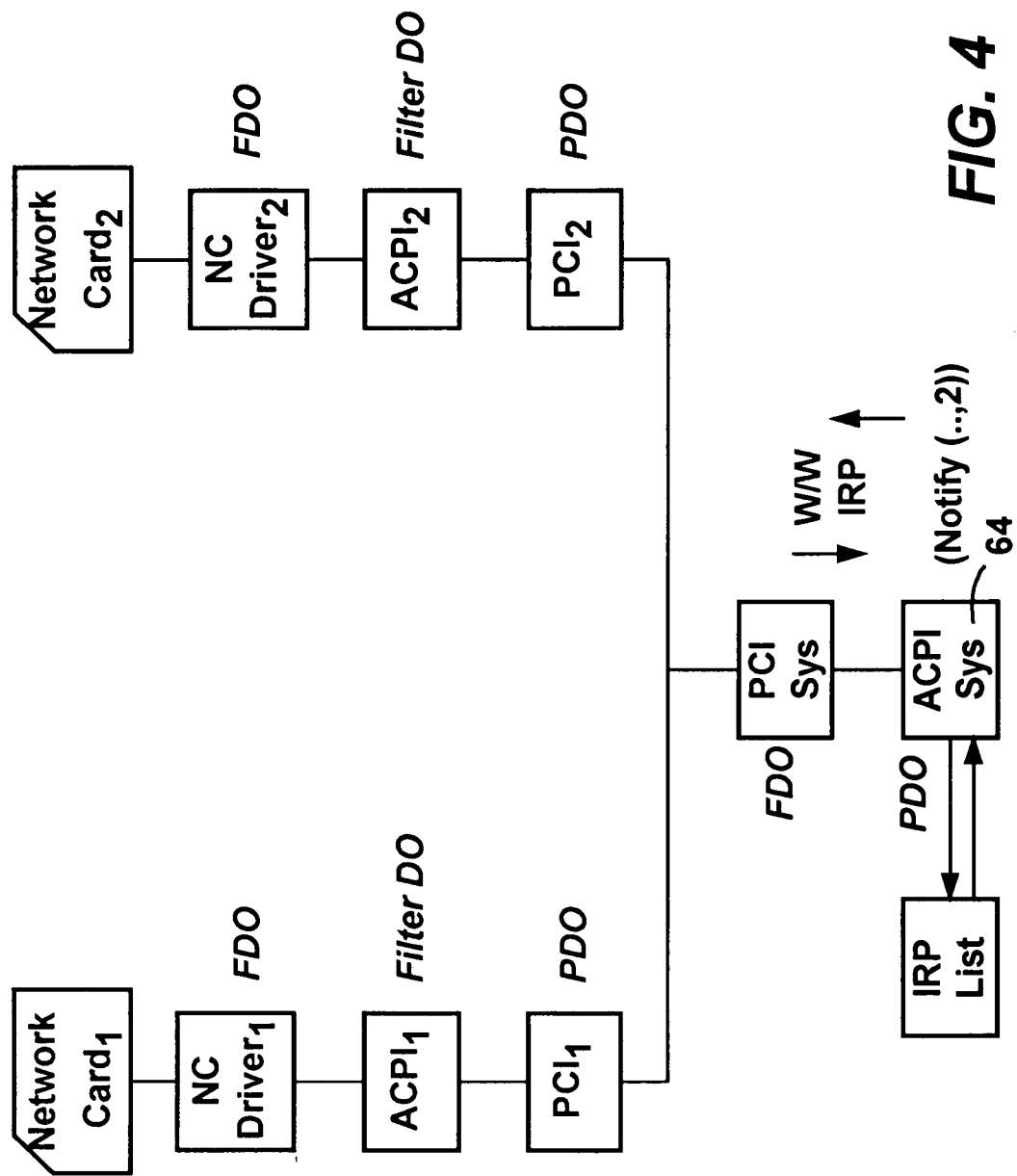
FIG. 4 is a partial representation of drivers in an ACPI system.

As generally shown in FIG. 4, for each device described in the ACPI namespace 70, the ACPI driver 64 creates either a filter Device Object (filter DO) or a Physical Device Object (PDO). Note that FIG. 4 is only a partial representation, as ACPI loads itself onto every driver of which it is aware. If the device is capable of being enumerated by an element of another subsystem, such as a Plug-n-Play subsystem, that element of the other subsystem creates a PDO for the device and the ACPI driver 64 puts a filter DO on top of the PDO. If the ACPI namespace 70 is the only possible enumeration mechanism, the ACPI driver 64 creates the PDO. ACPI provides power management features to the device stack by means of these device objects. For more information on filter DOs, PDOs and Functional DOs (FDOs), refer to the Microsoft Windows® 2000 Driver Development Kit, available from the Microsoft Corporation of Redmond, Wash., and incorporated by reference herein.

Figure 5:
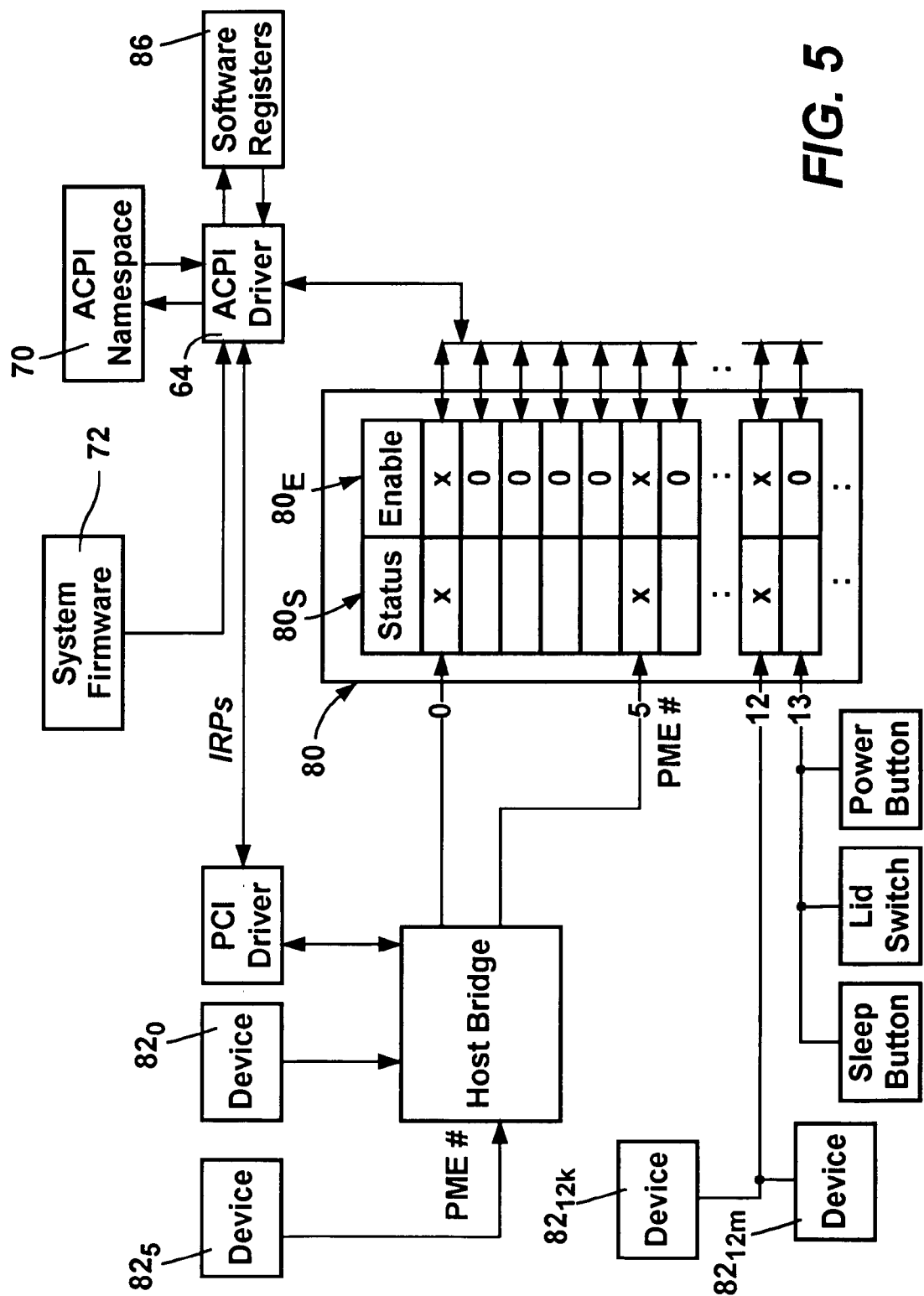
FIG. 5 is a block diagram generally representing how devices signal events to the ACPI driver and the ACPI driver selectively enables those events in accordance with one aspect of the present invention.

Turning to FIG. 5 of the drawings there is shown a general, exemplary architecture underlying the present invention. In FIG. 5, a number of hardware devices, which may include a network card $82_S$ and so forth, connect to a host bridge 84 (e.g., PCI bridge), wherein PCI power management supports wake events generated by functions on the PCI bus. As represented in FIG. 4, these devices may be wire-ORed together, (in accordance with the PCI Bus Power Management Interface Specification), and are capable of signaling general purpose events to the system, including wake events, by sending a power management event signal (PME#) to a hardware Status register $82_s$ in system I/O space. Other devices such as a lid switch $82_0$ of a laptop computer system, mouse $82_{12m}$ and keyboard $82_{12k}$ may also signal the Status register $80_S$ of the registers 80. In general, the Status register $80_S$ is sparsely populated, i.e., not all of the register pins are wired for having signals sent thereto, and those that are not wired (as known from the ACPI namespace 70) are not enabled in the Enable register $80_E$, and should be made inactive in the status register $80_S$. In other words, because AML/ASL code may describe to the operating system how to utilize these events that are not actually wired to a device, and thus there should not be a floating pin input that can set the corresponding SCI status bit in the GPE register $80_S$.

Figure 6:
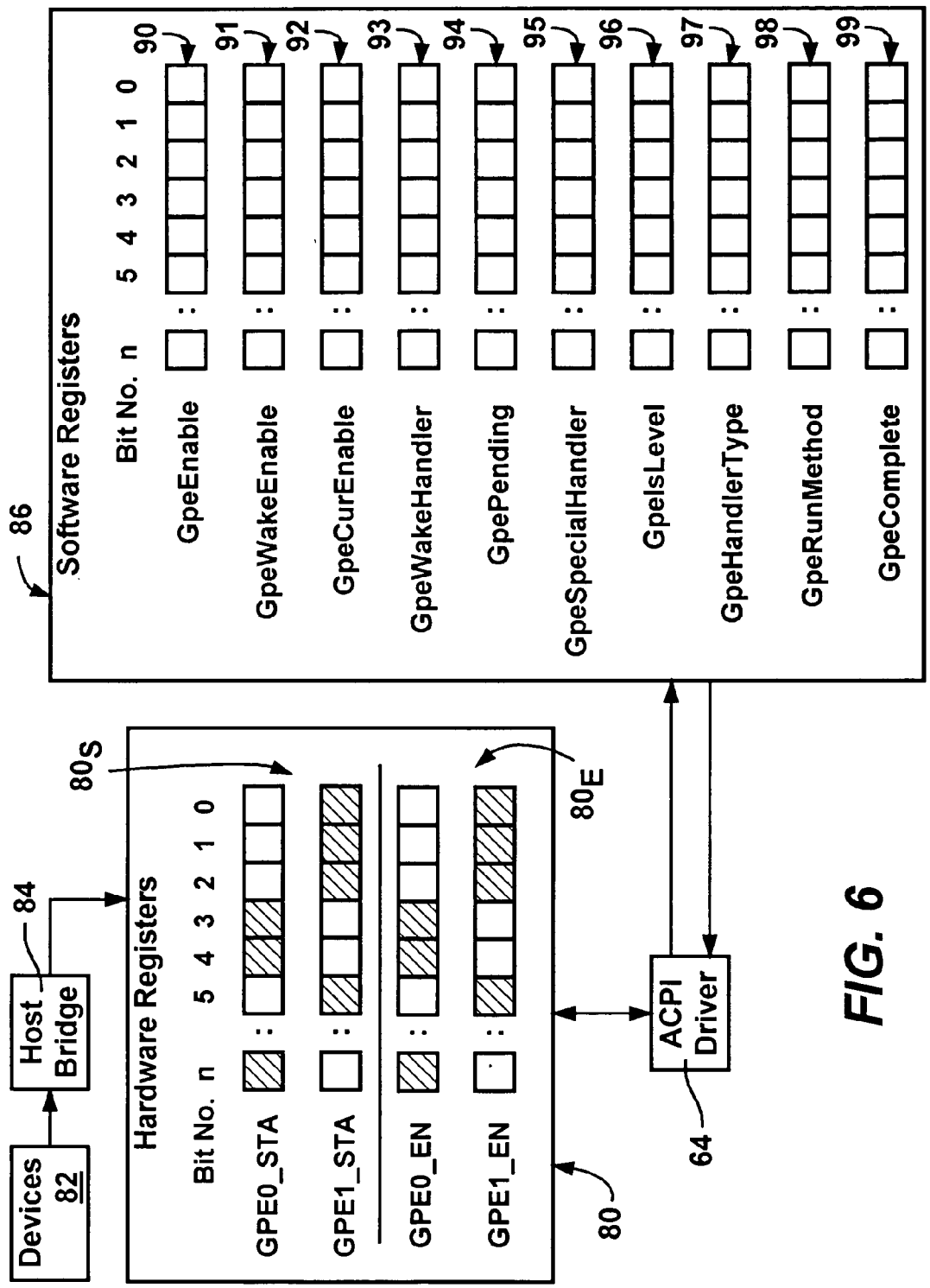
FIG. 6 is a block diagram generally representing registers controlled by the ACPI driver for handling and selectively enabling events in accordance with one aspect of the present invention.

Note that as shown in FIG. 6, the hardware register 80 may be implemented as two general-purpose register blocks, GPE0 and GPE1. Each register block contains a Status register and an Enable register, e.g., if a machine vendor specifies two, the registers are referred to as GPE0_STA, GPE0_EN, GPE1_STA, GPE1_EN. Each register block is 32-bit aligned, and is accessed by the ACPI driver 64 as a byte (regardless of their length), using single byte reads and writes offset from the start of the registers. For example, if the GPE0_STA register is two bytes long, then the ACPI driver will read a byte from the address of GPE0_STA, then read another byte from the address of GPE0_STA+1. For purposes of simplicity herein, the Status and Enable registers will be generally described as a single Status register $80_S$ and single Enable register $80_E$. The ACPI driver 64 owns these general-purpose event registers $80_S$, $80_E$, and other than the hardware device signaling the input pins of the Status register $80_S$, the register bits are only manipulated by the ACPI driver 64. For example, firmware code (e.g., 72) cannot directly adjust these bits. Thus, the ACPI driver manages the bits in the hardware register 80 directly, although the source to those events is not directly known and is connected into the system by control methods.

To summarize, each available status bit in this register $80_S$ may be set when a corresponding event is active, and is cleared by software (the ACPI driver 64) writing a one to its respective bit position. For the general-purpose event registers 80, unimplemented bits are ignored by the operating system software/ACPI 64. Each status bit can optionally wake up the system (and device) if asserted on an enabled pin when the system is in a sleeping state. The general-purpose event Enable register $80_E$ contains the general-purpose event enable bits. Each available enable bit in this register corresponds to the bit with the same bit position in the GPE Status register $82_S$. In other words, when the enable bit is set, then a set status bit in the corresponding status bit will generate a system control interrupt (SCI) bit.

It is the system hardware's responsibility to restore the host processor subsystem to a state which will permit the operating system to function (e.g., through ACPI or some other like architecture). If the sub-system is already in a D0 (working state), then the system hardware does not need to take any special action. The system is responsible for notifying the operating system that a PCI Power Management Event (PME) has occurred, via a PME signal, PME#. The PME# signal is expected to generate some form of System Control Interrupt (SCI), but whether this interrupt is handled by a device driver or an operating system service routine is left up to the individual operating system architecture. In an implementation described herein, the ACPI driver 64 will handle this interrupt, but as can be readily appreciated, the operating system and/or one or more other drivers may perform the handling.

In general, once the ACPI driver 64 has been notified that a PCI PME has occurred, it is the driver's responsibility to restore power to the primary PCI bus and to restore the PCI bus to the bus running (or B0) state, and also to restore power to any unpowered slots/devices. Then, the ACPI driver communicates with the PCI driver, which queries the PCI functions that have been configured with PME# enabled (in the Enable register $80_E$) to determine which function, or functions, had generated the PME#. More particularly, the ACPI driver tells the PCI driver that it should begin this process by handing back a Wait_Wake I/O request packet (W—W IRP) that the PCI driver originally sent to the ACPI driver. If the generating device is a bridge device, the PCI driver should follow this procedure for any subsequent PCI bridges. The PCI driver is capable of handling multiple PME#s generated by different functions simultaneously, devices for which PCI has a concept of a Function #, (since a single device can have multiple functions). Upon identifying the source or sources of the PME#, it is up to the PCI driver to identify the correct course of action with regard to waking the functions and/or the rest of the system.

In the PCI-based example described herein, before a PCI driver returns a function to the D0 operating state following a wake event, which will require a re-initialization of the function, it needs to ensure that the ACPI driver 64 has the information necessary to re-initialize the function, as well as any information necessary to restore the function. Note that this information is often client specific. By way of example, consider a situation in which a modem client has set up a modem function in a specific state in addition to default initialization (error correction, baud rate, modulation characteristics, and so forth). If the client/function is unused for an extended amount of time, power manager may place the modem in a D2 or perhaps even a D3 state. When the client is called upon to interact with the modem (such as a ring-resume event), the ACPI driver 64 will transition the modem function to the D0 initialized state. However, restoration of the modem function to D0 alone may not be sufficient for the function and client to perform the indicated task, but instead additional context may need to be restored for successful restoration of a function. The restoration needs to be transparent, to the extent that the host application is unaware that a power state transition and the associated restoration occurred.

When the ACPI driver receives a general-purpose event, it either passes control to an ACPI-aware driver, or uses a control method (e.g., supplied by an OEM) to handle the event. Note that the ACPI driver also has built-in policy in case there is no control method or separate driver to process the GPE, which is to treat the signal as a Notify(,0x2) on the devices that are on that pin. An OEM can implement between 0 (zero) and 255 general-purpose event inputs in hardware, each as either a level or edge event. Note that if a platform uses an embedded controller in the ACPI environment, then the embedded controller's SCI output is to be directly and exclusively tied to a single GPE input bit. Hardware can cascade other general-purpose events from a bit in the GPE hardware register 80 through status and enable bits in Operational Regions (I/O space, memory space, PCI configuration space, or embedded controller space).

Wake Event Handling

In general, one use of general purpose events is to implement device wake events. To this end, when a device (e.g., $82_S$) signals its wake signal, the general-purpose status bit used to track that device is set. For example, as shown in FIG. 5, the "5" location in the Status register $80_S$ would be set. While the corresponding general-purpose enable bit is enabled in the Enable register $80_E$, an SCI interrupt is asserted. If the system is sleeping, this will cause the hardware, if possible, to transition the system into the S0 state. Once the system is running, the ACPI driver 64 will dispatch the corresponding GPE handler, according to the information in the \_GPE namespace (FIG. 3).

From the \_GPE namespace, the handler determines which device object has signaled wake, and performs a wake "Notify" operation on the corresponding device object or objects that have asserted wake. In turn the ACPI driver 64 will notify the driver (or drivers) for each device that will wake its device to service it. However, as described above, in certain systems, a hardware signal is not cleared in response to the appropriate signal from the ACPI driver 64, whereby another notification that the event has fired is received, and the process repeated until the signal is cleared, which may never occur.

In accordance with one aspect of the present invention, to overcome this problem, there is provided an algorithm that selectively enables GPE events when they should be enabled, and disables them when they should not be enabled. In general, the algorithm first determines which pins (of the Status register $80_S$) are used for wake-events, either exclusively or shared with run-time events, and manages those pins differently from the other pins, (which are managed according to the ACPI specification).

To this end, the ACPI driver 64 maintains a number of sets of state regarding GPEs, in a set of operating-system-internal data structures (a block of storage allocated in the computer's main memory, having an arbitrary location, size and contents) referred to herein as software registers 86. As shown in FIG. 6, each software register includes a bit corresponding to each hardware register bit. Among the software registers is a GpeEnable software register 90, providing a mask of bits indicating those events for which there exists a GPE control method. As a general rule, the ACPI driver 64 will always arm the pins corresponding to this mask 90, i.e., set the enable bit in the hardware register $80_E$.

The GpeWakeEnable software register 91 maintains a list of GPE pins which are enabled because of a wakeup event, as described in more detail below. The GpeCurEnable software register 92 provides the mask of bits which are currently enabled, and is formed by taking a subset of the GpeEnable mask 90 and GpeWakeEnable 91 register.

In keeping with the present invention, the ACPI driver 64, which is responsible for handling GPEs, maintains other various sets of state regarding GPEs. One register for maintaining this additional state is a GpeWakeHandler software registerGpeWakeHandler software register 93, which comprises a mask of bits used exclusively for wake-up events. Also maintained is a GpeSpecialHandler 95, which is a mask of bits which might be used for wake-up events, but should always be treated as regular GPEs. Note that this register tracks likely shared wake-up and run-time events. The ACPI driver 64 also maintains a GpePending software register 94, a mask of bits that represent GPEs that have started to be processed, but have not yet completed. Other software registers represented in FIG. 6 include a GpeIsLevel software register 96, and a GpeHandlerType software register 97. A GpeRunMethod software register 98 is also provided for tracking the running of the control method associated with each GPE, and a GpeComplete software register 99 is provided to track completed events, as generally described below with respect to FIGS. 13–15. In general, one difference between the GpeRunMethod software register and the GpePending software register is that GpeRunMethod is only set until such a time as the ACPI driver is able to run the appropriate method. Once the ACPI driver is in a position to run the proper method, the GpeRunMethod is cleared. In comparison, the GpePending software register is set until the appropriate GPE method has successfully completed. However, as will be described below, GpeRunMethod software register enables the same control method to be run again if needed, such as in the case of a failure.

Figure 7:
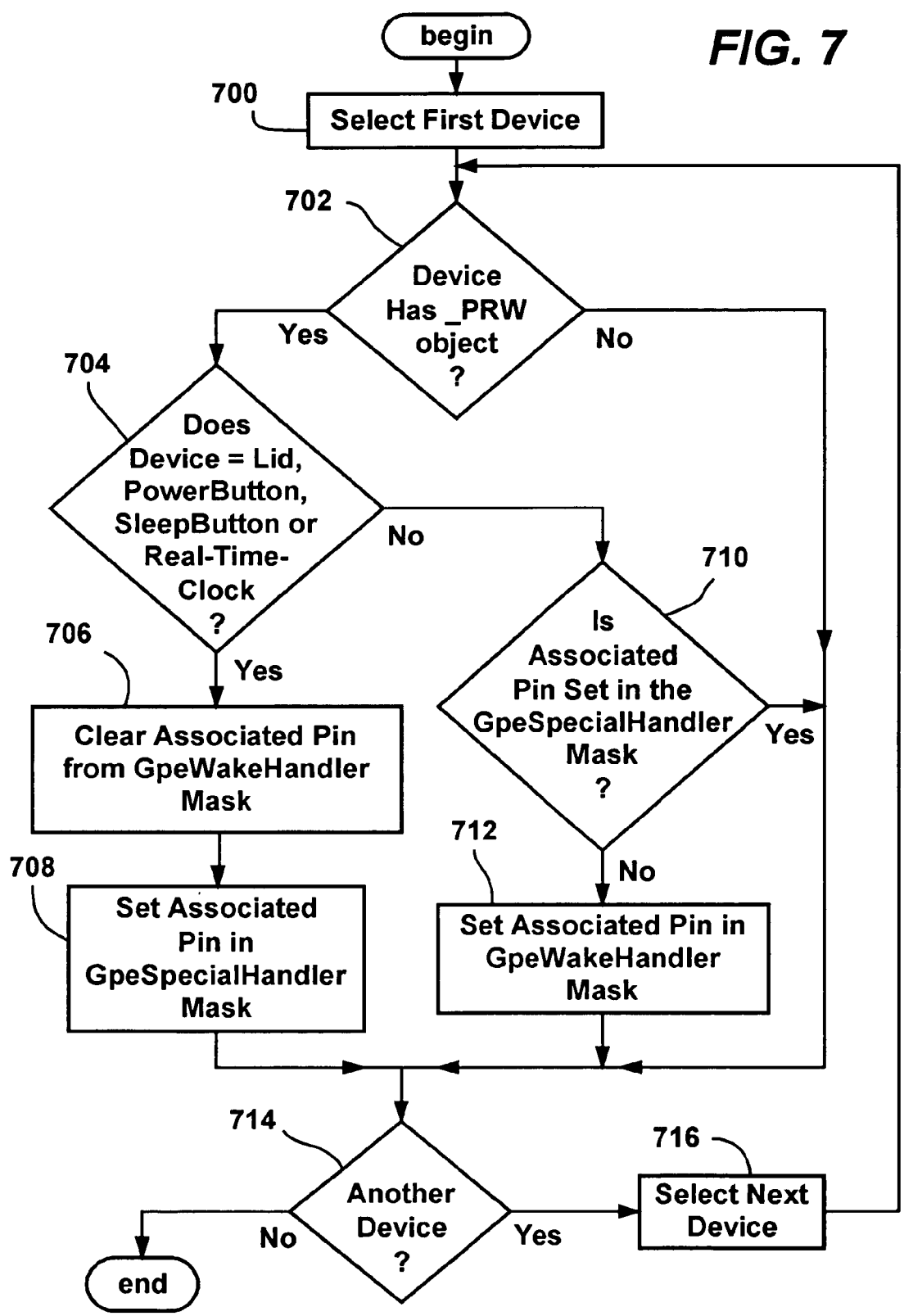
FIG. 7 is a flow diagram generally representing exemplary steps performed by the ACPI driver to configure certain of the registers of FIG. 6 at startup in accordance with one aspect of the present invention.

FIG. 7 provides a flow diagram representing a suitable algorithm for determining, in one implementation described herein, which of the pins used for wake-events. At boot time, the ACPI driver 64 examines the system tables/namespace and tries to determine which GPEs are associated with wake-up events. As represented by steps 700–702, each device with a \_PRW object is located. For each such device, at step 704 the \_PRW object is examined to determine whether the device corresponds to a Lid, PowerButton, SleepButton or Real-Time-Clock. If so, then at step 706, the associated pin is cleared in the GpeWakeHandler mask 93, and at step 708 is set in the GpeSpecialHandler mask 95 (FIG. 6) to track these devices. Note that via the general logic of FIG. 7, the ACPI driver thus specially treats the Lid, PowerButton, SleepButton, and Real-Time-Clock devices. This is because experience has determined that these devices use a GPE pin that shares wake-up and run-time events. In general, the use of these pin settings will be described below. Step 708 proceeds to step 714, to examine/process any other \_PRW objects.

If at step 704 the selected \_PRW object did not correspond to a Lid, PowerButton, SleepButton or Real-Time-Clock, the corresponding pin is not specially treated, and the process instead branches to step 710, wherein steps 710 and 712 set the associated pin in the GpeWakeHandler mask 93 when the associated pin in the GpeSpecialHandler mask 95 is not set. This establishes which events are wake only. Then, step 712 similarly proceeds to step 714–716, to examine/process any other \_PRW objects in the above-identified manner.

Figure 8:
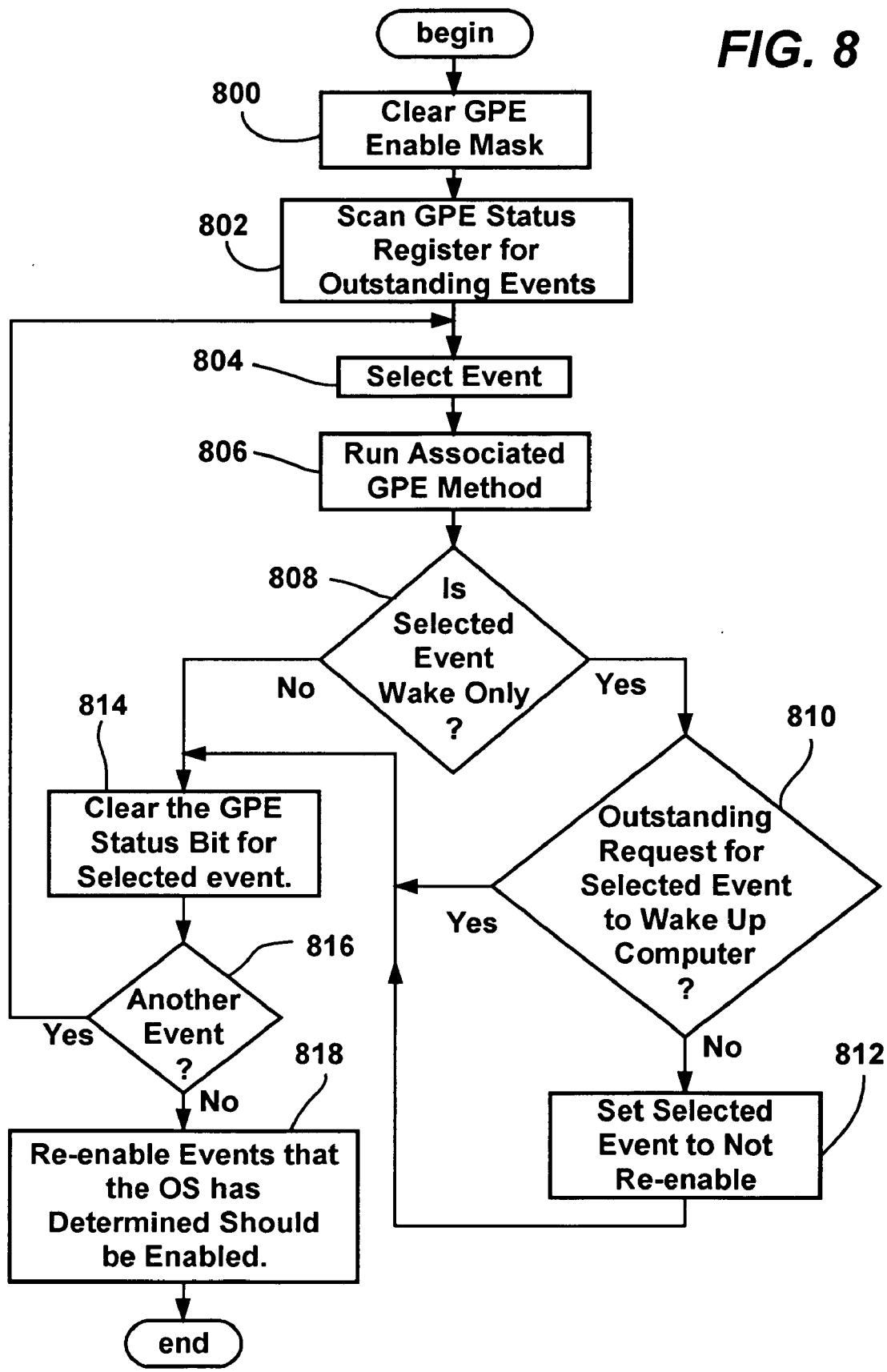
FIGS. 8 and 9 are each generalized flow diagrams representing alternative ways an operating system component may selectively enable events in accordance with one aspect of the present invention.
Figure 9:
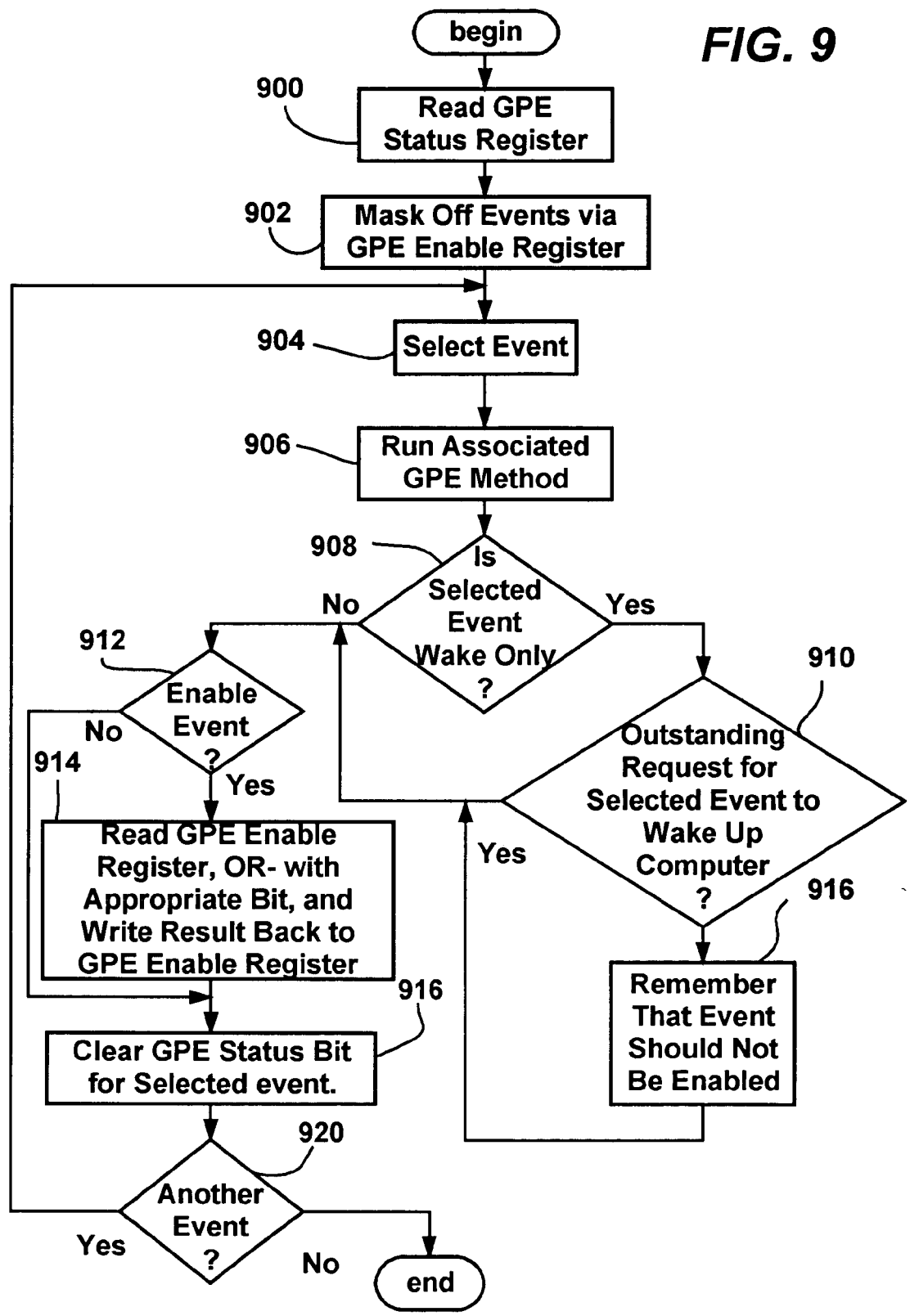

After the ACPI driver 64 (or other suitable operating system component) has determined which GPEs are run-time, wake, or shared and saved this information in the software registers 86, the driver 64 is ready to enable the GPE events and process them. At this time, various ways to process the GPEs are feasible. FIGS. 8 and 9 represents two general, alternative ways of those possible, while FIGS. 10–15 represent one other particular implementation. Since FIGS. 8 and 9 are general in nature, they will be described with respect to an operating system, although as in understood, the ACPI driver 64 or other component may perform some or all of the described operations.

In FIG. 8, when a GPE has been received, beginning at step 800 the GpeEnable mask 90 (and Enable register $80_E$) is cleared by the operating system, preventing interrupts from further events during the processing, i.e., until the mask is re-enabled. Then, at step 802, the GPE Status register $80_S$ is scanned for a list of outstanding events, as others events may have also been signaled at this time. Via steps 802–806, for each event indicated in the GPE Status register $80_S$, the associated GPE Method is run.

In accordance with an aspect of the present invention, when the GPE Method has completed for the event, a selective determination is made as to whether the driver 64 needs to re-enable that event. This is done at step by determining if the event is wake only (step 808), which, in one implementation is tracked by the GpeWakeHandler mask 93, and if there is no outstanding request for that event to wake up the computer (step 810). Such events will not be not re-enabled in the Enable register $80_E$ (step 812), for example, in one implementation by manipulating the information in the registers 86. For events that have been handled, the GPE status bit is cleared for that event at step 814. Via step 816, when all GPEs have been completed, step 818 re-enables the events that the operating system or the like has determined should be enabled. In one implementation, this is accomplished by manipulating the information in the software registers 86, as described below with respect to FIG. 15.

Another variation of this algorithm is represented in FIG. 9, beginning at step 900 wherein the GPE Status register $80_S$ is read. At step 902, the events that are set in the Status register are masked off via the GPE Enable Register $80_E$. Via steps 904–906 (and step 920), for each event indicated in the GPE Status register, the associated GPE Method is run.

At step 908, when each associated GPE method has completed, in accordance with an aspect of the present invention, a determination is made as to whether the operating system needs to re-enable that event. This is done by determining if the event is wake only (step 908), and if there is no outstanding request for that event to wake up the computer (step 910). If so, that event will not be enabled via step 912. At step 914, the GPE status bit for that event is cleared. If the event needs to be re-enabled (step 916), it is re-enabled as represented in step 918 by reading in the GPE Enable register $80_E$, OR-ing in the appropriate bit corresponding to that event, and then writing the result back to the GPE Enable register 80E. Step 920 repeats the process for other events.

Note that the logic in FIG. 9 is very similar to that of FIG. 8, except that in FIG. 8, the operating system maintains a list of GPEs that should be enabled, and re-enables all those events simultaneously, whereas in the FIG. 9, the operating system instead turns particular events on and off as appropriate.

In one implementation described herein, the ACPI driver 64 performs the operations generally described in FIGS. 10–15. Many of these operations are similar to those described above with reference to FIGS. 8 and 9, and achieve a similar result, but are described herein to provide additional implementation details. As will be understood, the driver generally operates by manipulating the register values to selectively determine which pins should be re-enabled, thereby preventing GPE interrupt storms from locking the computer system in many cases.

Figure 10:
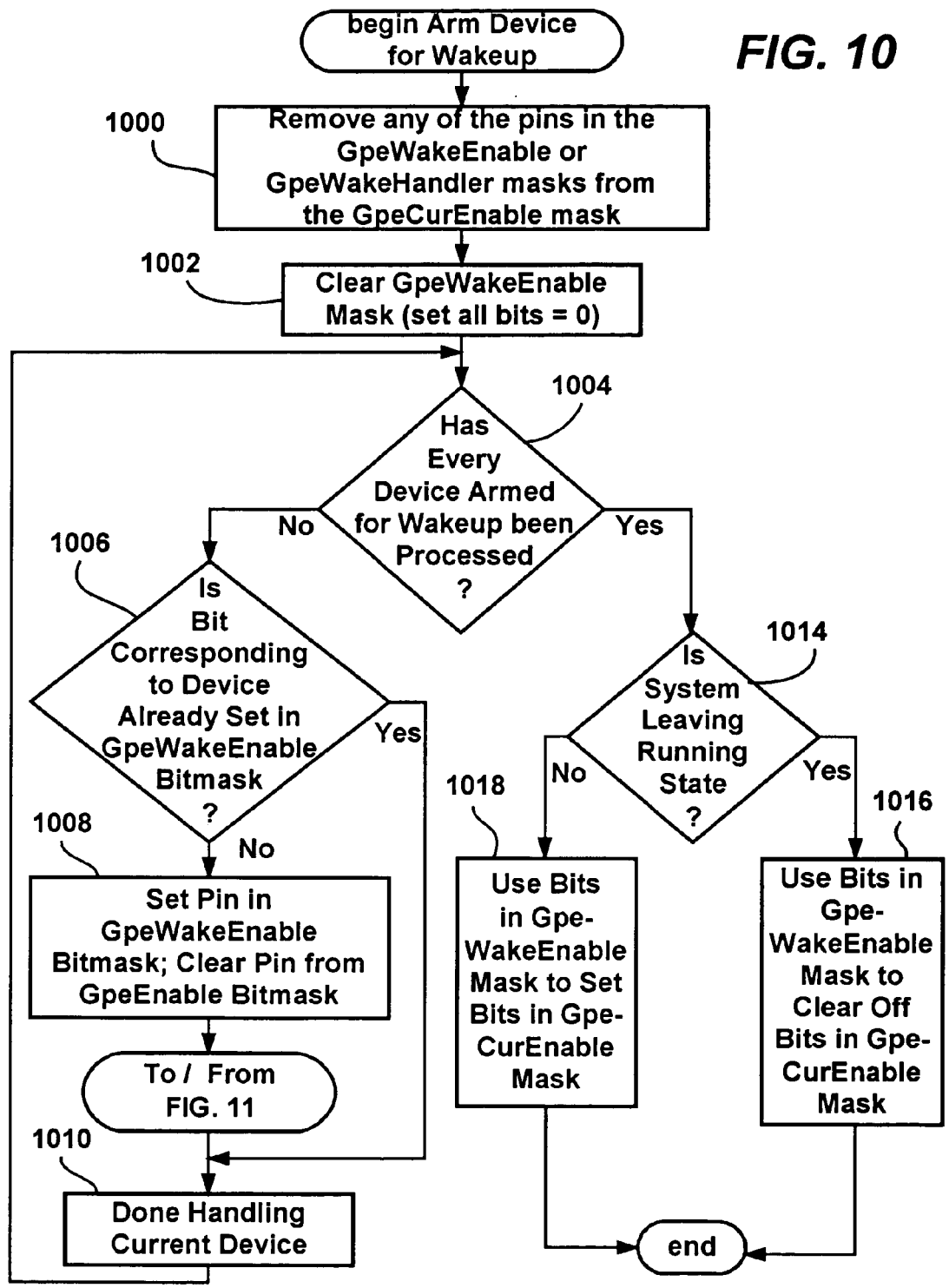
FIGS. 10 and 11 comprise a flow diagram generally representing exemplary steps taken by an ACPI driver to selectively enable certain events and prepare for the handling of other events when the driver receives a request that a device should be armed for wakeup.

As represented in FIG. 10, when the ACPI driver 64 receives a request that a device should be armed for wakeup, (e.g., via an IRP such as a wait-wake IRP held by the ACPI driver in a list until a corresponding event occurs), at step 1000 the ACPI driver 64 removes any of the pins in the GpeWakeEnable mask 91 or GpeWakeHandler mask 93 from the GpeCurEnable mask 92. This effectively removes the non-run-time events from the list of GPEs that are enabled to fire. Then, at step 1002, the ACPI driver clears the GpeWakeEnable mask 91 (i.e., zeroes it out). Note that in the described implementation, the ACPI driver 64 thus performs the selective enabling of certain wake events, and other, existing components, including those that request the arming of the device for wakeup, need not be modified or even be aware of the selective enabling process.

Via step 1004, for each device wake-up request of which the ACPI driver 64 is aware, if the pin is not set in the GpeWakeEnable bitmask 91, as tested for at step 1006, then the pin is set in the GpeWakeEnable software register 91, and the pin is cleared from the from the GPE Status register $80_S$ at step 1008. The process then continues to step 1100 of FIG. 11.

Figure 11:
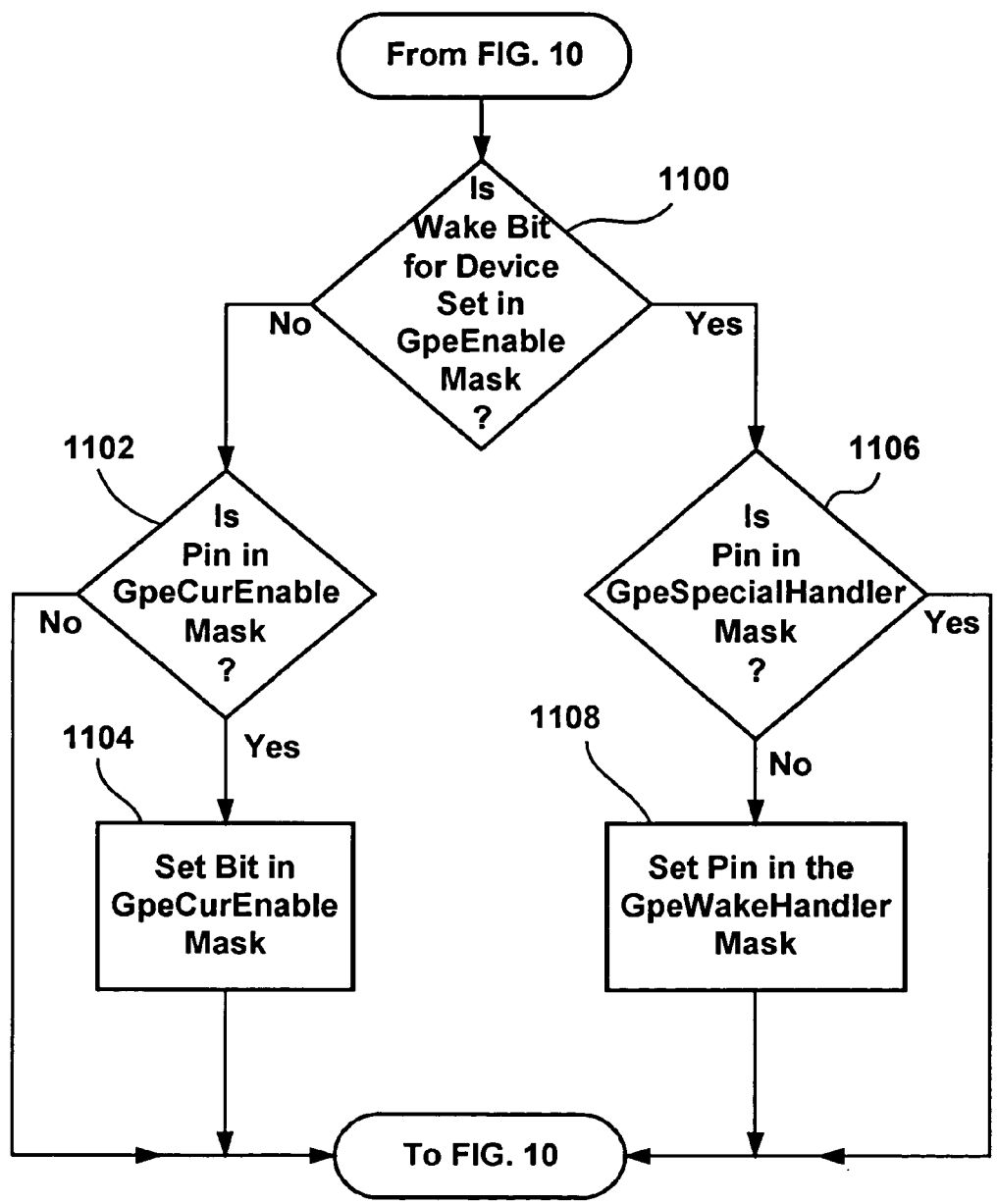

At step 1100 of FIG. 11, if the pin is not set in the GpeEnable bitmask 90 (to handle the case there is no GPE control method associated with the pin, in which case the event has to be a wake-only event), and the pin is also not set in the GpeCurEnable bitmask 91 as evaluated by step 1102, then the pin is set in the GpeCurEnable bitmask 92 at step 1104. Note that because it is known to be a wake event, it is also noted that the event is Level-triggered, so that is not incorrectly treated as Edge-triggered. The process then returns to step 1010 of FIG. 10.

Returning to the other possibility, if at step 1100 of FIG. 11 the pin was set in the GpeEnable bitmask 90, which means that the pin has a GPE Control Method associated with it and this there is a possibility that it is a run-time event, then the pin is evaluated in the GpeSpecialHandler bitmask 95 at step 1106. If at step 1106 the pin is not set in the special handler bitmask 95, i.e., it is not treated as a special case, then the pin is set in the GpeWakeHandler bitmask 93. The process then returns to step 1010 of FIG. 10.

At step 1010, the current device has been handled, and the process returns to step 1004 to determine whether every device that is armed for wakeup has been processed in the above manner. If not, steps 1006–1010 are repeated for those devices, including the steps described above with respect to FIG. 11. If every device that is armed for wakeup has been processed as described above, the process continues to step 1014.

Step 1014 represents the checking as to whether the system is leaving the running state, i.e., is going to sleep. If so, then the process clears the pins in the GpeWakeEnable bitmask 91 from the GpeCurEnable bitmask 92 at step 1016. Otherwise, step 1018 is executed to set the pins from the GpeWakeEnable bitmask 91 in the GpeCurEnable bitmask 92.

As is understood, the above mechanism ensures that the list of pins in the GpeCurEnable bitmask 92 are not ones that will cause the operating system an interrupt storm when the system attempts to re-enter the working state. The logic of FIGS. 10 and 11 further ensures that pins which are associated with a wake-event are not enabled during the system's transition between the working and the sleeping state. This prevents a wake event that occurs after the system begins the transition to the sleeping state from being forgotten or ignored, whereby in such a situation the computer system will not enter the sleep state.

Figure 12:
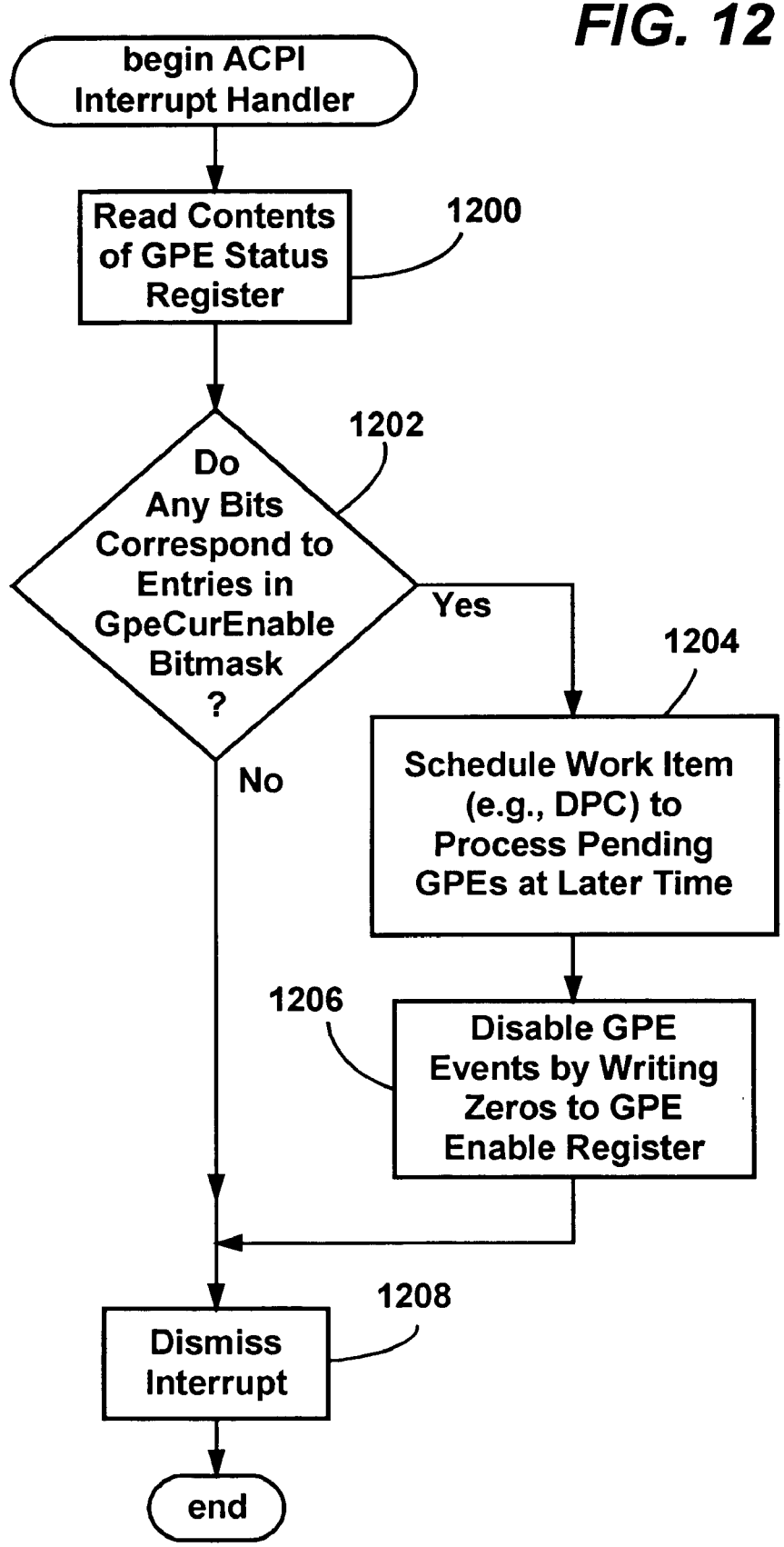
FIG. 12 comprises a flow diagram generally representing logical steps taken in the ACPI driver to handle an interrupt when an event is received.

FIG. 12 describes a general way in which the ACPI driver handles interrupts, including those resulting from wake events selectively enabled in accordance with the present invention. When the ACPI driver 64 receives an interrupt, the ACPI driver reads the contents of the GPE Status register as represented beginning at step 1200 of FIG. 12. If (step 1202) any of the bits correspond to entries in the GpeCurEnable bitmask, then at step 1204 a work item is scheduled to process the pending GPEs at a later time. Note that a suitable work item in one implementation with the Windows® 2000 operating system comprises a deferred procedure call (DPC), and thus for simplicity the present invention is described herein with reference to a DPC. However, it should be understood that the present invention may utilize any similar software/mechanism as a work item, and that the present invention is not limited to any particular operating system, environment and/or work item. GPE events are then disabled at step 1206 by writing zeros to the GPE Enable register 90, and the interrupt is dismissed at step 1208.

Figure 13:
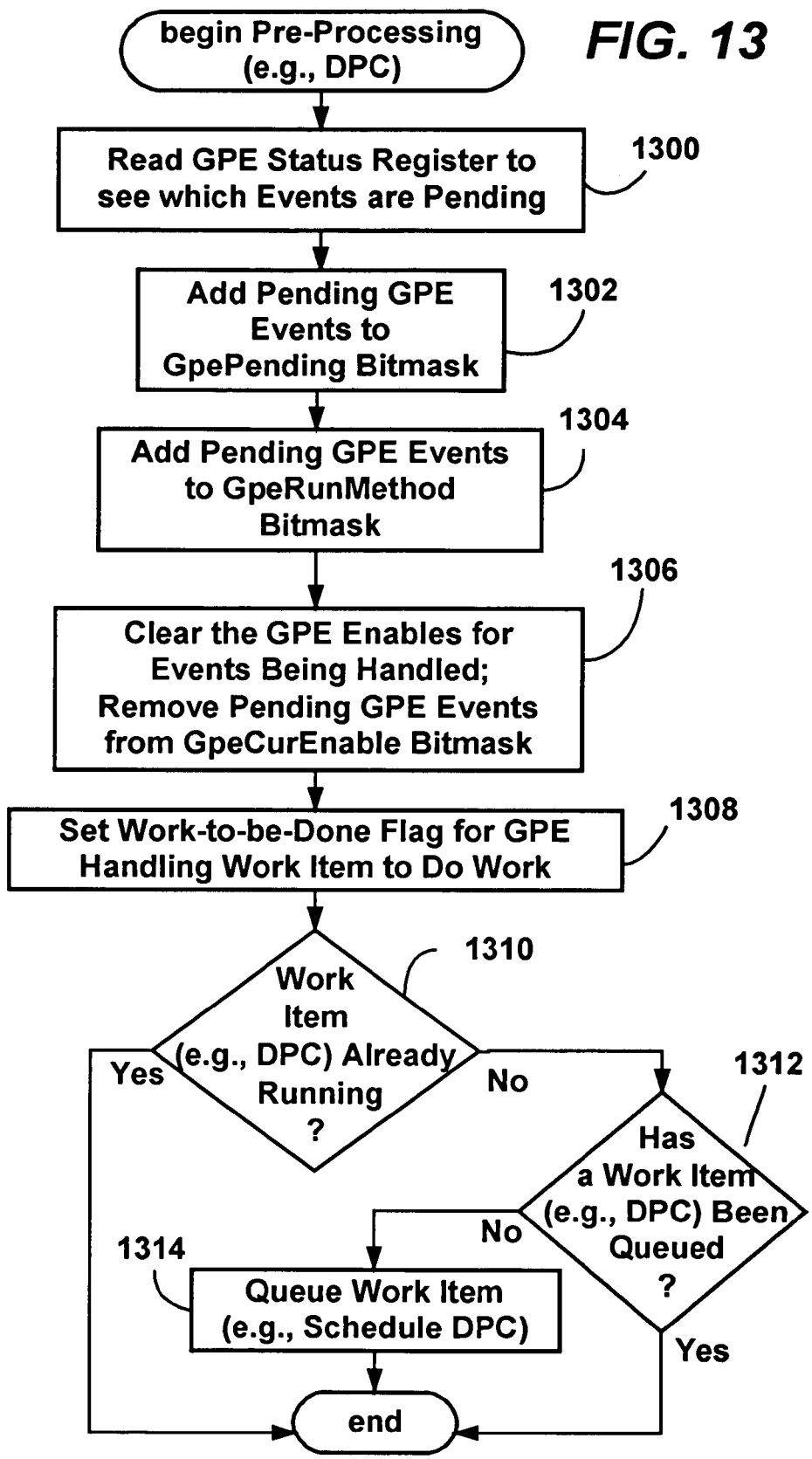
FIGS. 13, 14A, 14B and 15 comprise a flow diagram generally representing logical steps taken to handle wake and other events in accordance with one aspect of the present invention.

FIG. 13 generally represents the operations performed in a first, pre-processing work item (e.g., DPC), such as the call that was scheduled in FIG. 12, to prepare for handling the outstanding GPEs. At step 1300 of the DPC, the GPE Status register 80S is read to see which events are pending. To remember that the pending GPE event is an outstanding event, the pending GPEs are added to the GpePending bitmask 94 at step 1302. At step 1304, the GpeRunMethod bitmask 98 is similarly set to remember to run the control method associated with each GPE. Via step 1306, the GPEs are then no longer enabled so they will not be turned on until the work is completed for them; the pending GPE events are removed from the GpeCurEnable bitmask 92. Note that although not shown in FIG. 13, if the GPE is edge triggered, they have been cleared at this time by using the GpeIsLevel software register 96.

At step 1308, a "work-to-be-done" flag is set to tell a second, GPE handling DPC that work needs to be done. If the GPE handling DPC is already running as represented by step 1310, e.g., as known via another flag, then because the work-to-be-done flag was set at step 1308, the GPE handling DPC will not exit, but will rerun and perform the work set up in steps 1300–1306. Thus there is no need to schedule it to run, and the pre-processing DPC ends via step 1310. Similarly, if the GPE handling DPC is already scheduled to run, e.g., as known via another flag, as tested for at step 1312, there is no need to reschedule the running of the GPE handling DPC. However, if not already running and not scheduled, step 1314 is executed to schedule the GPE handling DPC. Note that the GPE handling DPC may be scheduled in the future, e.g., after an appropriate delay such as a two second pause, such as to give a GPE storm time to subside, e.g., as the PCI driver may clear a PME# event from one of its devices, or some other hardware condition may change.

Figure 14A:
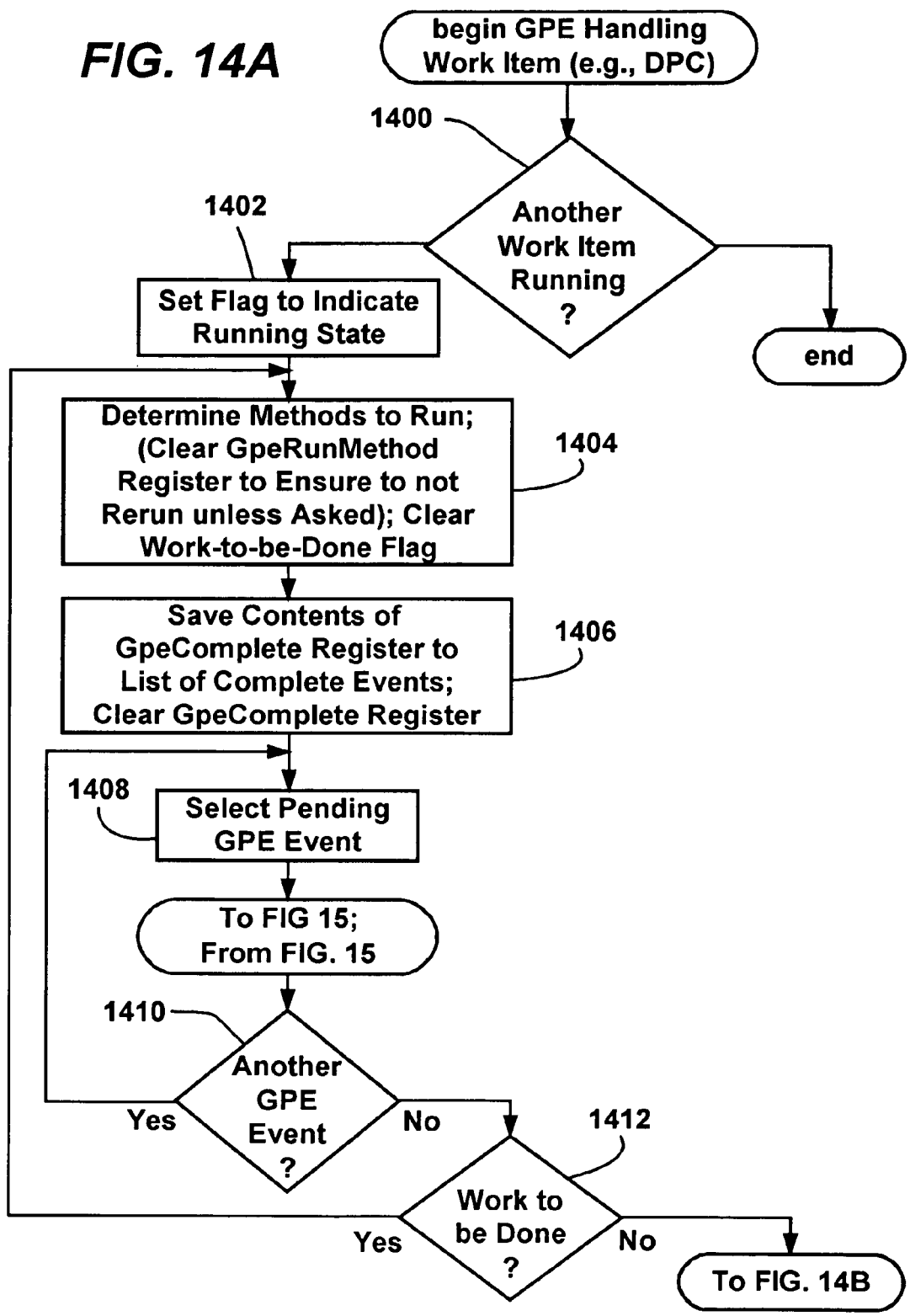

As represented in FIG. 14A, the GPE Handling DPC process (or for example, a thread of execution of a process) first tests to make sure that no other GPE Handling DPC is running. If one is, the process returns, otherwise, step 1400 branches to step 1402 which sets the flag to indicate that the GPE Handling DPC is now running. Step 1404 determines which methods need to be run from the GpeRunMethod software register 98, and then clears the GpeRunMethod software register 98 to ensure that the methods will not be run again, unless there is cause to do so, (e.g., the hardware event fires, or the operating system determines that there is a good reason for re-running the method, such as an error during the previous execution). Also, as represented at step 1404, the work-to-be done flag is cleared. At step 1406, the contents of the GpeComplete software register is saved to a list of completed events, and the GpeComplete software register is cleared. Then, via steps 1408 and 1410, the process of FIG. 15 is performed on each pending GPE event.

Figure 15:
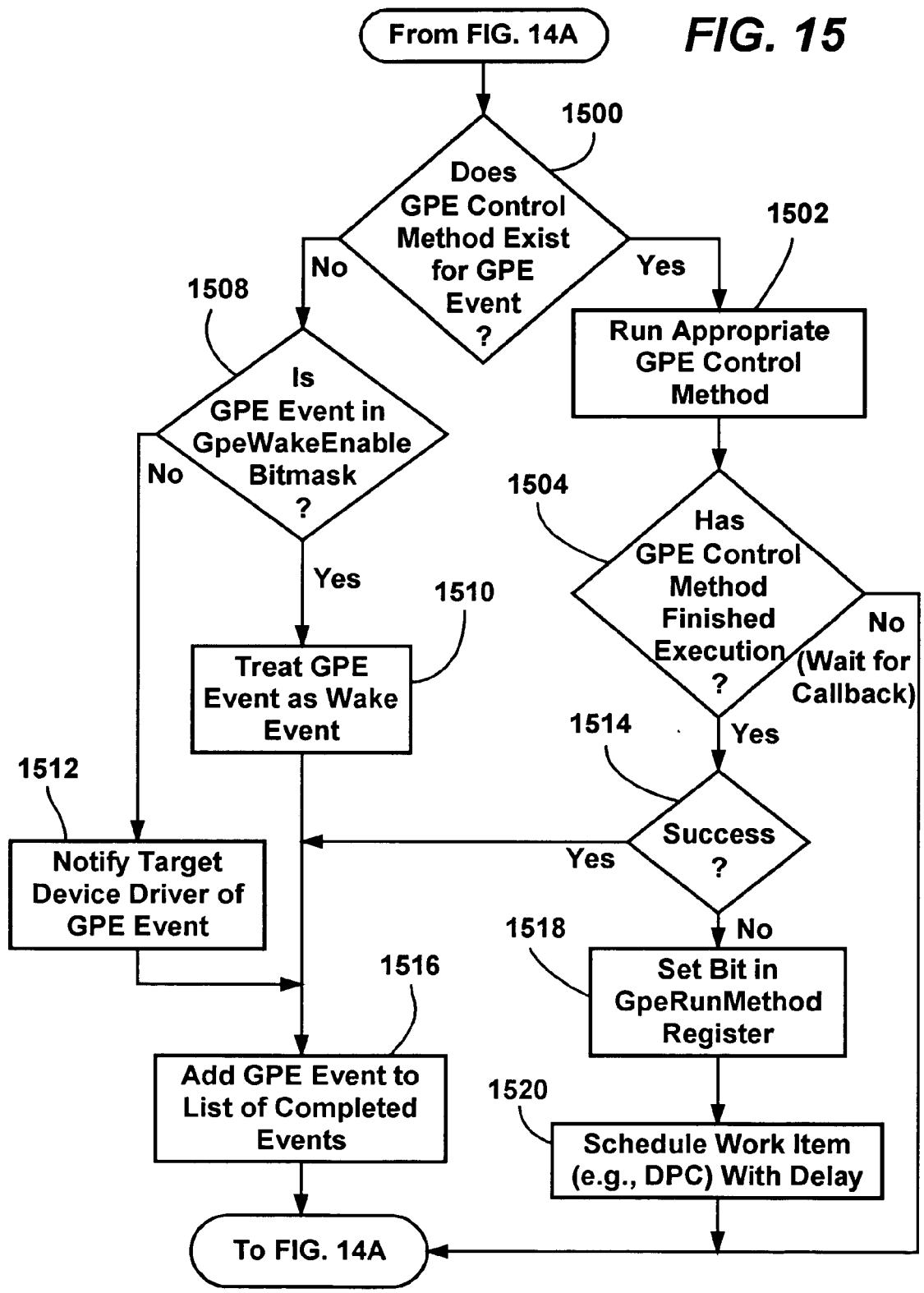

As represented in FIG. 15, when a pending GPE event is selected, step 1500 tests whether a GPE control method exists for the GPE event. If so, step 1500 branches to step 1502, which runs the appropriate GPE control method. Step 1504 tests whether the GPE control method has finished execution, and if so, continues to step 1514. Otherwise, the DPC stops handling this bit, and continues operating while awaiting a callback, e.g., from another thread. Note that the DPC recognizes that it can do no further processing on this particular GPE at this time, but continues running to possibly work on other GPES, until the callback is invoked, whereby operation will resume on that particular GPE as generally described below with respect to FIG. 16. If the status is finished at step 1504, the "Yes" branch continues to step 1514, where, because there is a possibility that the call failed, particularly due to an out of memory condition, success or failure is evaluated. For example, the failure may be detected by evaluating an errorcode or the like. If successfully finished at step 1514, the process adds the GPE event to the list of completed events at step 1516. Step 1516 then continues to step 1410 of FIG. 14A to (possibly) repeat for any pending GPE event.

If the call instead fails as determined by step 1514, step 1518 is executed to re-run the control method by again setting the bit in the GpeRunMethod software register. Then, at step 1520, the DPC is scheduled with a delay, e.g., two seconds or some other appropriate duration, generally to give a chance for memory to be freed during the delay. In this way the DPC will again execute at some later point in time, wherein step 1404, which will pick up the control method that failed and cause it to attempt to re-run again, will be reached if the work-to-be done variable within the current DPC is set (as tested via step 1412), or when the DPC restarts after the delay and sees that no other DPC is running.

Figure 16:
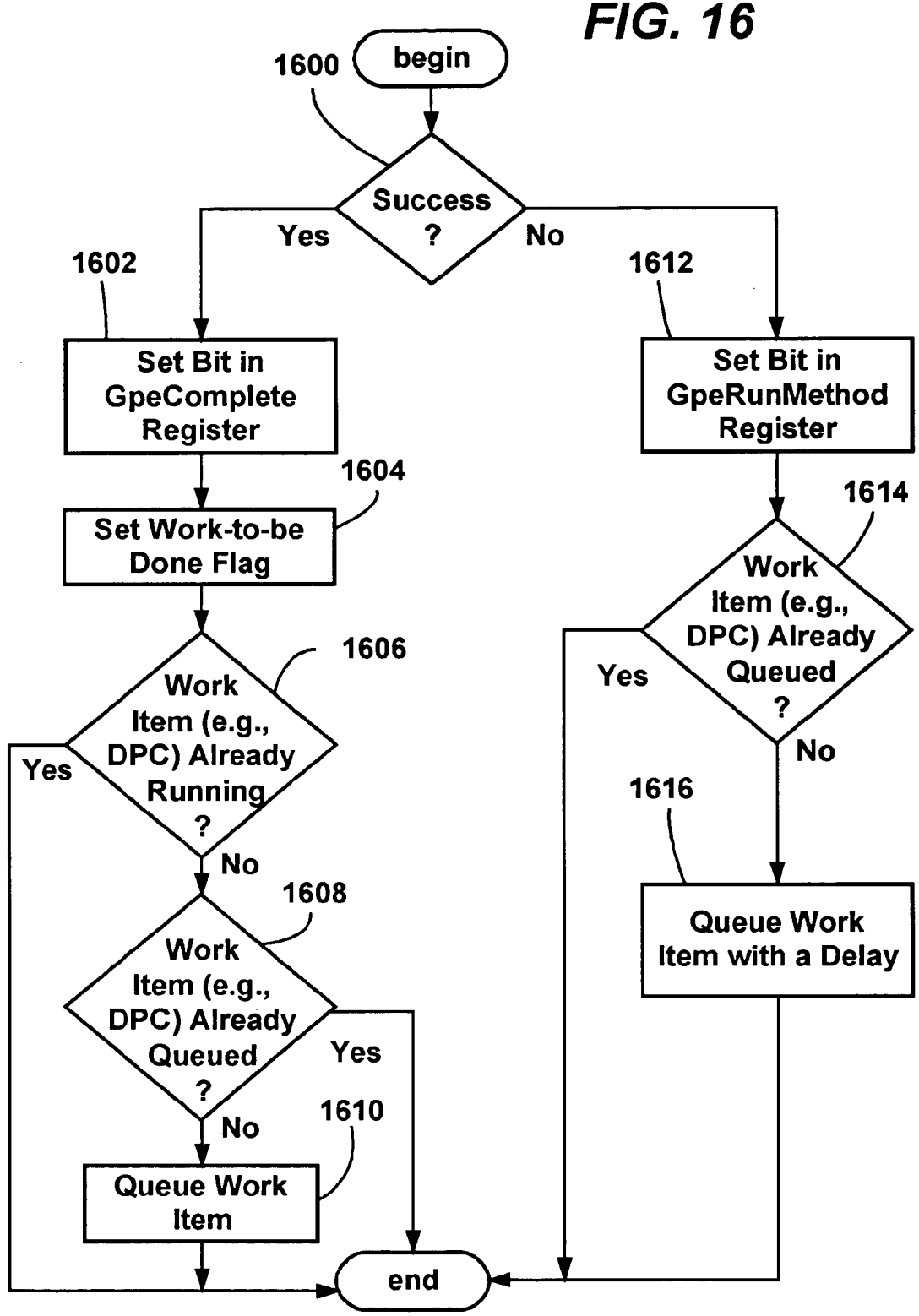
FIG. 16 is a flow diagram representing steps taken in a case wherein the handling of a GPE in FIG. 14A has waited for a callback.

FIG. 16 describes the situation in which the DPC essentially stopped running (step 1504 of FIG. 15) until a callback was received, beginning at step 1600 wherein the success or failure of the control method is tested, (similar to step 1514). If successful, a bit is set to indicate the completed status of this control method in the GpeComplete software register at step 1602, and the work-to-be-done flag is set at step 1604. Then, unless already running, or, as a further optimization, unless already scheduled, as determined via steps 1606 and 1608, respectively, the GPE handling DPC is scheduled to run at step 1610.

If the control method failed, step 1602 instead branches to step 1612 wherein a bit is set in the GpeRunMethod software register so as to again attempt running of the control method. Note that as described above, this handles the case wherein execution of a control method failed because of a low memory or other condition. Then, step 1614 tests whether the GPE handling DPC is already scheduled, and if not, at step 1616 schedules it, including a pause. Note that the delay is scheduled in the hope that the system will be able to free memory during this time, as low memory is a common cause of failure. Note that the "Work Done" bit is not set at this point, in the hope that if the DPC is currently running, it will not have cause to jump back to step 1404. If it does, however, that will not be a problem because the DPC is doing meaningful work on GPEs that completed successfully. Eventually, however, the only outstanding GPE may be the one that failed, whereby not setting the work-to-be-done flag will prevent the DPC from jumping from 1412 to 1404 and thereby provide the delay for freeing memory.

Returning to the situation wherein at step 1500 there is no GPE control method for the selected GPE event, step 1508 is executed, which tests whether the GPE event is in the GpeWakeEnable bitmask. If so, the GPE event is treated as a wake event at step 1510 such as to wake the system if sleeping, e.g., it is a wake event shared with a run-time event. Then step 1510 continues to step 1516 to add the GPE event to the list of completed events. However, if at step 1508 the GPE event is not in the GpeWakeEnable bitmask, then the target device driver of the GPE event is notified per the ACPI specification (e.g., it is a run-time event) at step 1512, and then the GPE event is added to the list of completed events at step 1516. As represented in FIG. 15, the process then returns to step 1410 of FIG. 14A to repeat for other pending GPE events, if any.

When no more GPE events are pending, step 1410 branches to step 1412, to determine if more work needs to be done (by checking the work-to-be-done flag). If so, the DPC returns to step 1404 and continues to do work, otherwise the DPC continues to step 1420 of FIG. 14B where the GPEs in the list of completed events are processed.

Figure 14B:
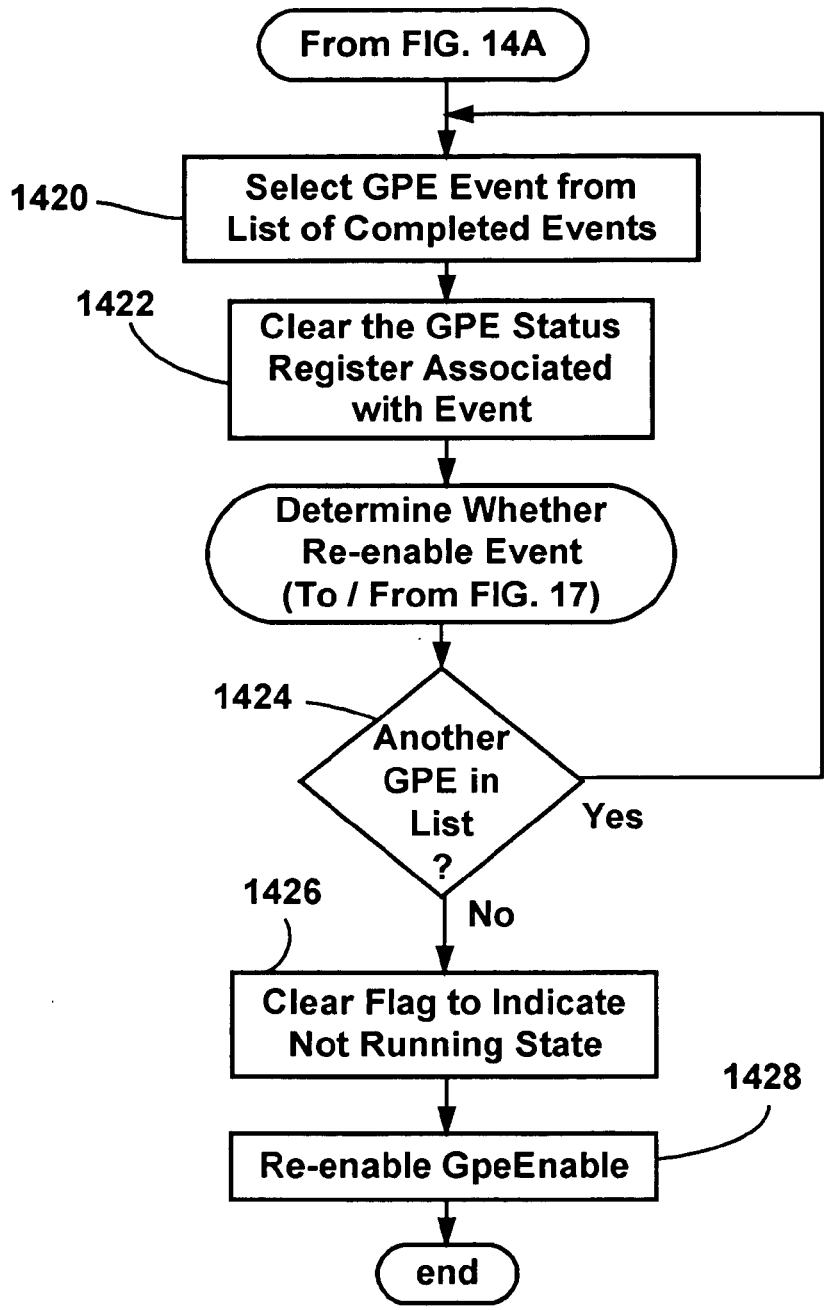

Beginning at step 1420 of FIG. 14B, for each GPE (via step 1420 and 1424), the GPE Status register associated with the event is cleared at step 1422. Note that FIGS. 14A and 14B this is only an abstraction for Level-triggered GPEs, as Edge-triggered GPEs are cleared earlier, e.g., at approximately steps 1402/1404 of FIG. 14A. Also, a function is called that determines if the GPE event should be re-enabled or not, as generally described below with reference to FIG. 17. Note that in the event that the GPE control method does not finish execution within the context of the DPC, (step 1504), the completion routine will also call the same function of FIG. 17 that determines whether the GPE event should be re-enabled, as described below.

Figure 17:
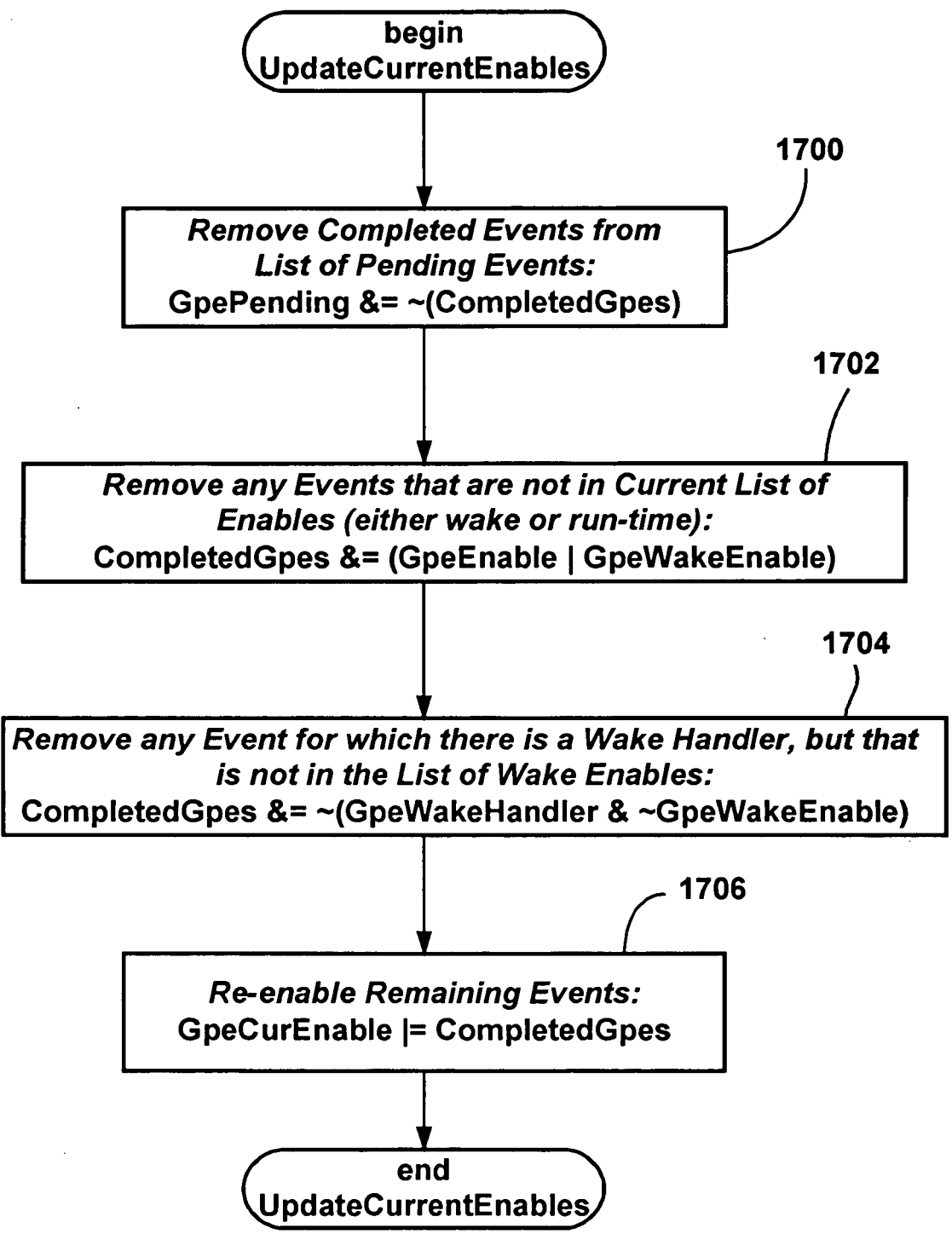
FIG. 17 is a flow diagram generally representing a function performed in one implementation to selectively re-enable events in accordance with one aspect of the present invention.

FIG. 17 describes the function that determines whether each completed GPE event should be re-enabled. Because of the binary operators used to manipulate the information in the software registers 86, FIG. 17 is described as a pseudo-C function. Thus, at step 1700, the completed events are removed from the list of pending events by the following function:

GpePending &=~(CompletedGpes).

Next, at step 1702 any events that are not in the current list of enables are removed, including either wake or run-time events, by the following operation:

CompletedGpes &=(GpeEnable |GpeWakeEneble)

Then, any events for which there is a wake handler, but is not in the list of wake enables, is removed by the following operation as represented in step 1704:

CompletedGpes &=~(GpeWakeHandler & ~GpeWakeEnable).

Lastly, via step 1706 the remaining events are re-enabled:
GpeCurEnable |=CompletedGpes Returning to FIG. 14B, step 1418 clears the flag to indicate that the DPC is no longer in the running state. Step 1420 then re-enables those GPEs for which it has been determined (FIG. 17) that the GPEs should be re-enabled.

As can be seen from the foregoing detailed description, there is provided a method and system wherein selective enabling of wake events prevents the effect of general purpose event interrupt storms in a computer system. The method and system adapt to existing systems, and do not require changes to existing hardware and/or software other than to a software component that executes the selective enabling algorithms.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system configured for providing hardware events to software, a method comprising:

determining from a set of possible events at least one wake event directed to waking the system;

selectively enabling each wake event via a software register that includes a mask of bits representing events to cause a method to be run for each wake event having an associated method; and selectively determining whether to re-enable each wake event such that the software controls whether to rerun any method associated with any wake event signaling that its associated method is to be run.

2. The method of claim 1 wherein determining at least one wake event includes accessing information provided in system firmware.

3. The method of claim 1 wherein selectively enabling each wake event includes writing at least one bit to a register location.

4. The method of claim 1 wherein determining at least one wake event includes determining a wake only event, and wherein selectively enabling each wake event includes not enabling the wake only event when the system is in a running state.

5. The method of claim 1 wherein determining at least one wake event includes determining a wake only event, and wherein selectively enabling each wake event includes enabling the wake only event when the system is entering a sleep state.

6. The method of claim 1 wherein determining at least one wake event includes determining a wake only event, and wherein selectively enabling each wake event includes enabling the wake only event when a device is entering a low power state.

7. The method of claim 1 wherein determining at least one wake event includes determining a shared wake and run-time event, and wherein selectively enabling each wake event includes enabling the shared event, and handling the shared event as a run-time event when the system is in a running state and as a wake event when the system had been in a sleeping state.

8. The method of claim 1 further comprising, receiving a signal corresponding to an enabled event, and causing execution of a method in response to the signal.

9. The method of claim 1 further comprising, receiving a signal corresponding to an enabled event, and waking a device in response to the signal.

10. The method of claim 1 further comprising, receiving a signal corresponding to an enabled event, and waking the system in response to the signal.

11. A computer-readable medium having computer-executable instructions, which when executed perform the method of claim 1.

12. A computer system, comprising:

a status register configured to receive signals corresponding to events from hardware devices;

an enable register connected to a system software register and configured to enable events having signals received in the status register; and a component of the system software register including a mask of bits representing events and configured to determine, from a set of possible events, wake events directed to waking the system, and further configured to selectively enable each wake event to cause a method to be run for each wake event having an associated method, and to selectively determine whether to re-enable each wake event, such that the component controls whether to rerun any method associated with any wake event signaling that its associated method is to be run.

13. The system of claim 12 wherein the component accesses information provided in system firmware to determine the wake events directed to waking the system.

14. The system of claim 12 wherein the component maintains a plurality of data structures for tracking wake event information.

15. The system of claim 12 wherein the component accesses a namespace to determine a method corresponding to an event.

16. The system of claim 15 wherein the component accesses information provided in system firmware to construct the namespace.

17. The system of claim 12 wherein the component system accesses system firmware to determine events that are shared wake events and run-time events.

18. The system of claim 12 wherein the component system accesses system firmware to determine events that are wake only events.

19. In a computer system, a method comprising:
receiving a wake event provided via hardware;
running a method associated with the wake event; and
after completion of the method, selectively determining in a software resister that includes a mask of bits representing events whether the wake event requires re-enablement, and if so, re-enabling the wake event.

20. The method of claim 19 further comprising, identifying the wake up event by accessing information provided via system firmware.

21. The method of claim 19 wherein re-enabling the wake event includes writing to a register location.

22. The method of claim 19 further comprising, selectively enabling the wake event, including not enabling the wake event when the system is in a running state.

23. The method of claim 22 wherein selectively enabling the wake event includes enabling the wake only event when the system is entering a sleep state.

24. The method of claim 22 wherein selectively enabling the wake event includes enabling the wake event when the system is entering a low power state.

25. The method of claim 22 wherein the wake event shares a hardware register location with a run-time event, and further comprising, handling an event at that location as a run-time event when the system is in a running state and as a wake event when the system had been in a sleeping state.

26. A computer-readable medium having computer-executable instructions, which when executed perform the method of claim 19.

27. In a computer system, a method comprising:
identifying a shared event comprising a wake event shared with a run-time event;
selectively enabling the shared event;
selectively determining via a software register that includes a mask of bits representing events, whether the shared event is to be re-enabled, and if so, re-enabling the shared event.

28. The method of claim 27 wherein identifying the shared event includes accessing information provided in system firmware.

29. The method of claim 27 wherein selectively enabling the shared event includes writing to a software register location.

30. The method of claim 27 further comprising handling the shared event as a run-time event when the system is in a running state and as a wake event when the system had been in a sleeping state.

31. A computer-readable medium having computer-executable instructions, which when executed perform the method of claim 27.

* * * * *